United States Patent
Mochida

(10) Patent No.: US 10,863,859 B2
(45) Date of Patent: Dec. 15, 2020

(54) MILK BEVERAGE FEEDING DEVICE

(71) Applicant: FUJI ELECTRIC CO., LTD., Kawasaki (JP)

(72) Inventor: Yukihide Mochida, Kanagawa (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 636 days.

(21) Appl. No.: 15/665,460

(22) Filed: Aug. 1, 2017

(65) Prior Publication Data

US 2017/0325624 A1 Nov. 16, 2017

Related U.S. Application Data

(63) Continuation of application No. PCT/JP2016/050644, filed on Jan. 12, 2016.

(30) Foreign Application Priority Data

Mar. 3, 2015 (JP) .................. 2015-041672

(51) Int. Cl.
*A47J 31/44* (2006.01)
*A47J 31/41* (2006.01)

(52) U.S. Cl.
CPC ........... *A47J 31/4485* (2013.01); *A47J 31/41* (2013.01); *A47J 31/44* (2013.01)

(58) Field of Classification Search
CPC ......... A47J 31/41; A47J 31/4485; A47J 31/44
USPC ....................................... 99/293, 294, 323.3
See application file for complete search history.

(56) References Cited

U.S. PATENT DOCUMENTS

| | | | |
|---|---|---|---|
| 4,549,813 A * | 10/1985 | Volz ................. | B01F 5/045 137/897 |
| 6,810,795 B1 | 11/2004 | Hsu | |
| 2003/0232115 A1 | 12/2003 | Eckenhausen et al. | |
| 2004/0009281 A1* | 1/2004 | Green ............... | A47J 31/4485 426/590 |
| 2006/0230943 A1 | 10/2006 | Stieger et al. | |
| 2007/0089612 A1 | 4/2007 | Coccia et al. | |

(Continued)

FOREIGN PATENT DOCUMENTS

| | | |
|---|---|---|
| CN | 1488310 A | 4/2004 |
| CN | 101410170 A | 4/2009 |

(Continued)

OTHER PUBLICATIONS

Office Action dated Jul. 25, 2018 in corresponding Chinese Patent Application No. 201680008208.5, 15 pgs.

(Continued)

*Primary Examiner* — Ibrahime A Abraham
*Assistant Examiner* — John J Norton

(57) ABSTRACT

A milk beverage feeding device includes an undiluted-solution storage storing a milk-beverage undiluted solution; an undiluted-solution feeder feeding the milk-beverage undiluted solution; a vapor feeder feeding a pressurized vapor in a pressurized state; an air feeder feeding compressed air in a compressed state; and a mixer mixing the milk-beverage undiluted solution fed from the undiluted-solution storage through the undiluted-solution feeder, the pressurized vapor fed from the vapor feeder, and the compressed air fed from the air feeder to form a mixture and feed the mixture as a milk beverage to a beverage container.

3 Claims, 26 Drawing Sheets

(56) References Cited

U.S. PATENT DOCUMENTS

| | | | | |
|---|---|---|---|---|
| 2011/0083561 A1* | 4/2011 | Douma | ............... | A47J 31/4485 |
| | | | | 99/323.1 |
| 2013/0112083 A1* | 5/2013 | Douma | ............... | A47J 31/4485 |
| | | | | 99/294 |
| 2015/0020691 A1 | 1/2015 | Midden et al. | | |
| 2015/0024103 A1* | 1/2015 | Bronnimann | ....... | A47J 31/4485 |
| | | | | 426/474 |
| 2018/0078084 A1* | 3/2018 | Nagayoshi | ........... | B67D 1/0046 |

FOREIGN PATENT DOCUMENTS

| | | |
|---|---|---|
| JP | 2004-99171 | 4/2004 |
| JP | 2006-289096 | 10/2006 |
| JP | 5242907 | 4/2013 |

OTHER PUBLICATIONS

International Search Report dated Apr. 19, 2016 in corresponding International Application PCT/JP2016/050644, filed Jan. 12, 2016.
Written Opinion for PCT/JP2016/050644, dated Apr. 19, 2016 in corresponding International Application PCT/JP2016/050644, filed Jan. 12, 2016.

* cited by examiner

MILK BEVERAGE FEEDING DEVICE

CROSS-REFERENCE TO RELATED APPLICATION(S)

The present application claims priority to PCT International Application No. PCT/JP2016/050644 filed on Jan. 12, 2016 and based upon and claiming the benefit of foreign priority from Japanese Patent Application No. 2015-04172 filed on Mar. 3, 2015, the entire contents of which are incorporated herein by reference.

BACKGROUND

The present disclosure relates to a milk beverage feeding device.

Conventionally, for example in a beverage dispenser that provides a coffee beverage such as cappuccino, a beverage dispenser that feeds milk in a foamed state is proposed in Japanese Patent No. 5242907. In Japanese Patent No. 5242907, by feeding vapor in a pressurized state and feeding air in a compressed state to a beverage container to which milk has been fed beforehand and stirring the milk, the milk is foamed.

SUMMARY

According to the present disclosure, a milk beverage feeding device includes an undiluted-solution storage storing a milk-beverage undiluted solution; an undiluted-solution feeder feeding the milk-beverage undiluted solution; a vapor feeder feeding a pressurized vapor in a pressurized state; an air feeder feeding compressed air in a compressed state; and a mixer mixing the milk-beverage undiluted solution fed from the undiluted-solution storage through the undiluted-solution feeder, the pressurized vapor fed from the vapor feeder, and the compressed air fed from the air feeder to form a mixture and feed the mixture as a milk beverage to a beverage container.

DETAILED DESCRIPTION

In Japanese Patent No. 5242907, because the pressurized vapor and the compressed air are fed to the beverage container to which milk has been fed beforehand and the milk is stirred, the milk and the like may scatter around the beverage container, which is not hygienic.

The present disclosure has been achieved in view of the above problems, and the present disclosure is to provide a milk beverage feeding device that can feed a milk beverage in a foamed state while ensuring a hygienic state.

Preferred embodiments of a milk beverage feeding device according to the present disclosure will be described below in detail with reference to the accompanying drawings.

Figure 1:
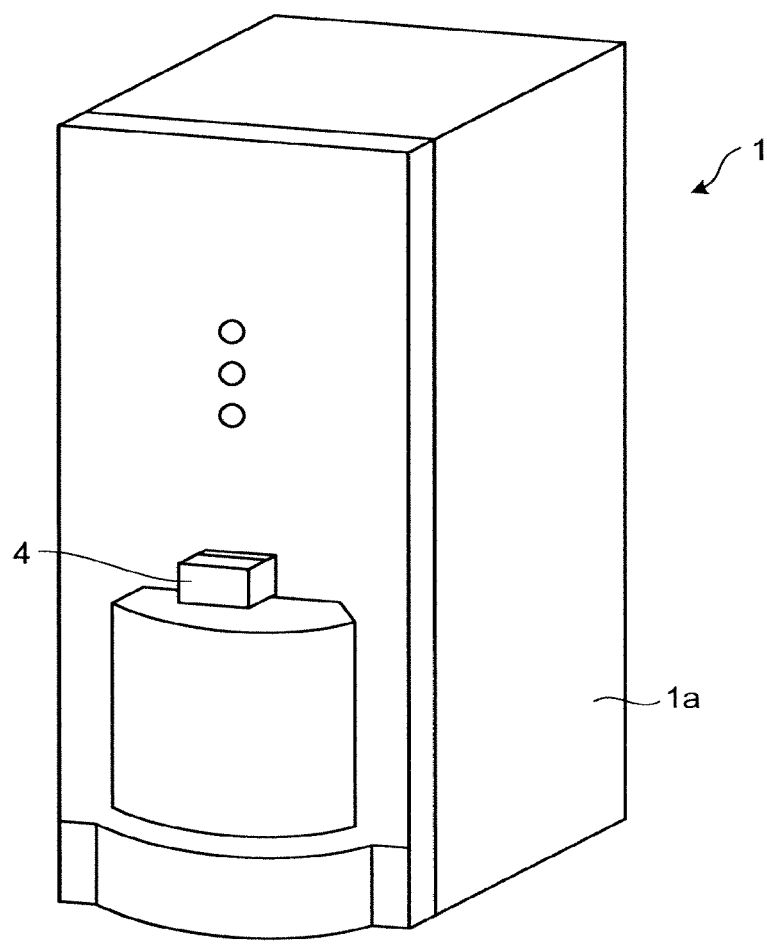
FIG. 1 is a perspective view of a beverage dispenser to which a milk beverage feeding device according to an embodiment of the present disclosure is applied.
Figure 2:
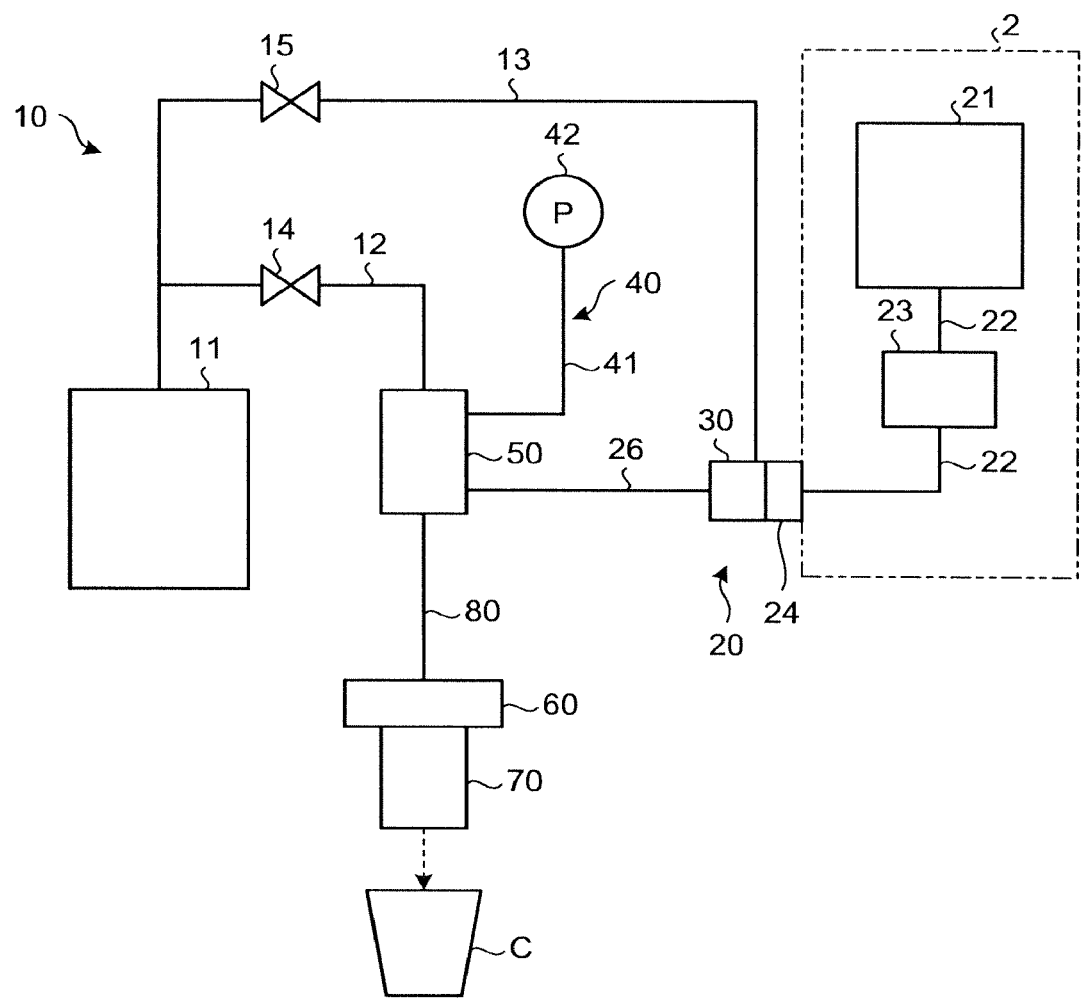
FIG. 2 is a schematic diagram illustrating a configuration of the milk beverage feeding device according to the embodiment of the present disclosure.

FIG. 1 is a perspective view of a beverage dispenser to which a milk beverage feeding device according to an embodiment of the present disclosure is applied. FIG. 2 is a schematic diagram schematically illustrating a configuration of the milk beverage feeding device according to the embodiment of the present disclosure. A beverage dispenser 1 illustrated herein feeds a coffee beverage to a cup C (see FIG. 2) being a beverage container.

The milk beverage feeding device according to the present embodiment is applied to the beverage dispenser 1 to feed milk being a milk beverage to the cup C in a foamed state. The milk beverage feeding device is configured to include a vapor feeding unit (vapor feeder) 10, an undiluted-solution feeding unit (undiluted-solution feeder) 20, an air feeding unit (air feeder) 40, a mixing unit (mixer) 50, a foaming unit 60, and a nozzle unit 70.

The vapor feeding unit 10 is configured to include a vapor tank 11, a first vapor feed pipe 12, and a second vapor feed pipe 13. The vapor tank 11 is a tank conventionally known and generates pressurized vapor.

The first vapor feed pipe 12 is connected to the vapor tank 11 at one end and to the mixing unit 50 at the other end, thereby connecting the vapor tank 11 to the mixing unit 50. In the middle of the first vapor feed pipe 12, a first vapor feed valve 14 is provided. The first vapor feed valve 14 is open or closed in response to a command provided from a control unit (not illustrated).

When being open, the first vapor feed valve 14 allows the pressurized vapor to pass through the first vapor feed pipe 12. When being closed, the first vapor feed valve 14 restricts the pressurized vapor to pass through the first vapor feed valve 14.

The second vapor feed pipe 13 is connected to the vapor tank 11 at one end and to a check-valve configuration unit 30 constituting the undiluted-solution feeding unit 20 at the other end, thereby connecting the vapor tank 11 to the check-valve configuration unit 30. The check-valve configuration unit 30 is described later.

In the middle of the second vapor feed pipe 13, a second vapor feed valve 15 is provided. The second vapor feed valve 15 is open or closed in response to a command provided from the control unit. When being open, the second vapor feed valve 15 allows the pressurized vapor to pass through the second vapor feed pipe 13. When being closed, the second vapor feed valve 15 restricts the pressurized vapor to pass through the second vapor feed valve 15.

The undiluted-solution feeding unit 20 is configured to include a bag-in-box (hereinafter may be referred to as a "BIB") 21, a tube pump 23, a plug 24, and the check-valve configuration unit 30.

Figure 3:
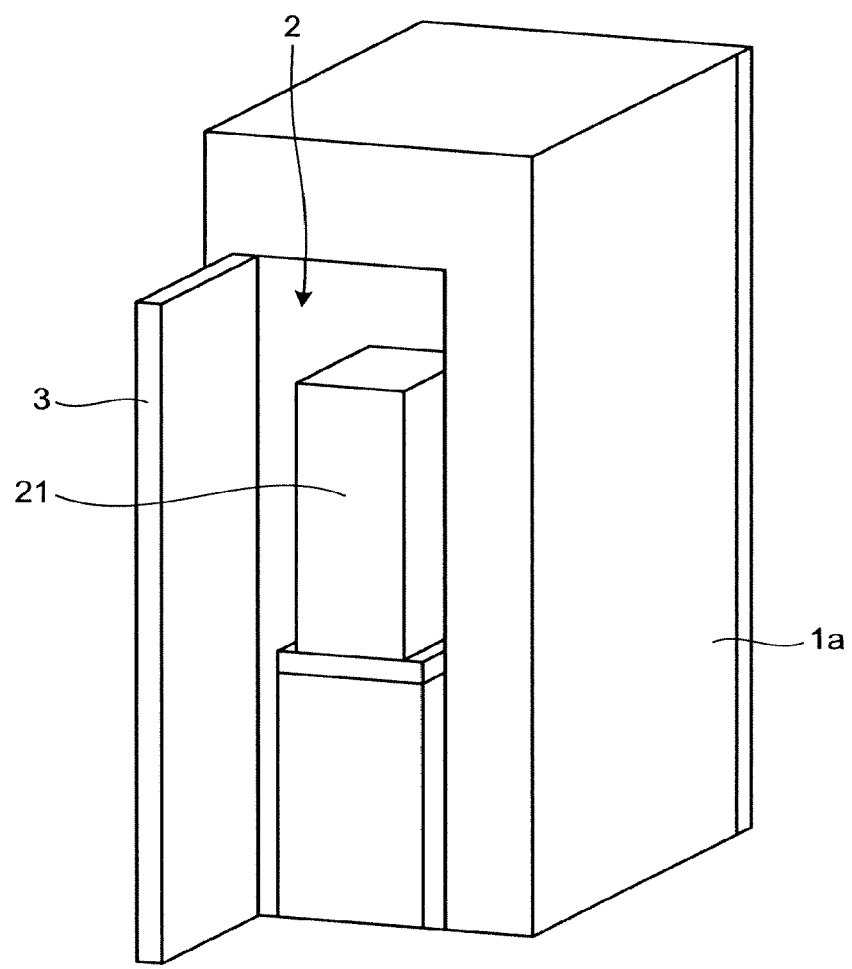
FIG. 3 is a perspective view of the beverage dispenser illustrated in FIG. 1 as viewed from the back.

The BIB 21 is configured to house a bag-like container, in which an undiluted solution of a milk beverage (milk in a foamed state) (hereinafter may be referred to as an "undiluted milk") to be fed to the cup C is enclosed, in a box-shaped container. The BIB 21 is provided in a refrigerator 2 of the beverage dispenser 1. The refrigerator 2 is a chamber having a heat-insulated structure provided inside a dispenser body 1a of the beverage dispenser 1, and is defined on a rear side of the inside of the dispenser body 1a. The refrigerator 2 is open or closed by a rear door 3 having the heat-insulated structure swingably provided on a rear surface of the dispenser body 1a, as illustrated in FIG. 3, and the BIB 21 is replenished in a state in which the refrigerator 2 is open by opening the rear door 3.

The tube pump 23 is provided below the BIB 21 inside the refrigerator 2. The tube pump 23 is driven by a command provided from the control unit. When it is driven, the tube pump 23 crushes a tube 22 connected to the BIB 21 by a plurality of rollers or the like to pump the undiluted milk out of the BIB 21.

Figure 4:
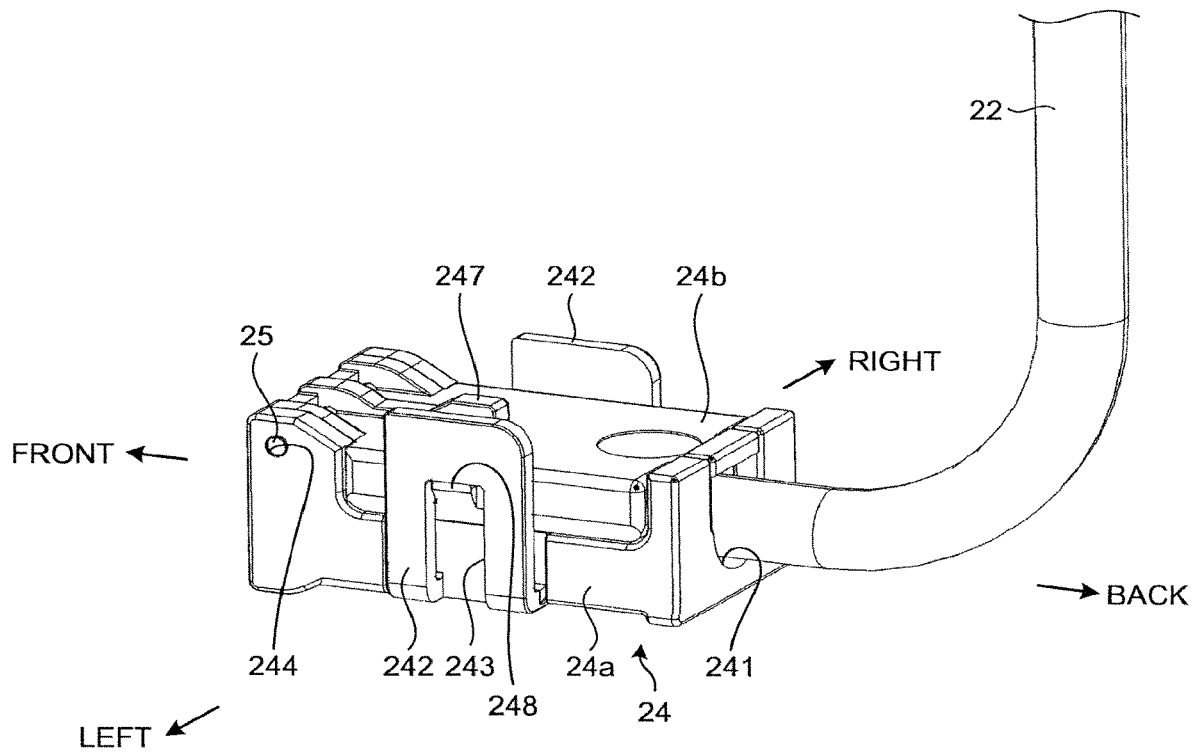
FIG. 4 is a perspective view illustrating a plug constituting an undiluted-solution feeding unit.

The plug 24 is attached to an end portion of the tube 22 connected to the BIB 21. FIG. 4 is a perspective view illustrating the plug 24 constituting the undiluted-solution feeding unit 20. As illustrated in FIG. 4, the plug 24 is configured to include a plug body 24a and a plug lid 24b.

Figure 5:
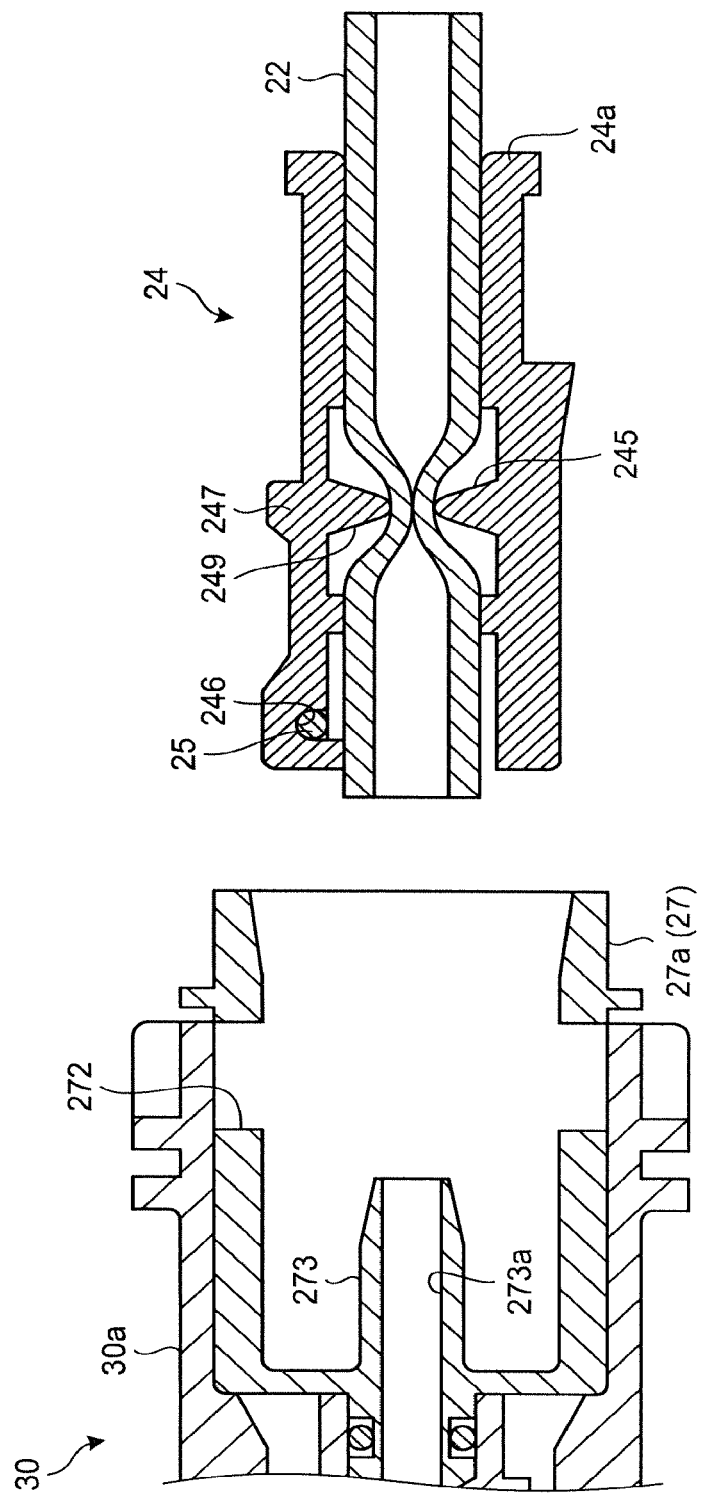
FIG. 5 is a cross-sectional view schematically illustrating a configuration of a plug and a socket.

The plug body 24a is substantially in a rectangular shape in which an upper part and a front part are open and a U-shaped rear groove 241 is formed in a rear part thereof. A matched pair of locking pieces 242 projecting upward are formed on the right and left opposite sides of the plug body 24a. A locking groove 243 is respectively formed in the matched pair of locking pieces 242. A matched pair of journaling holes 244 are formed on the front upper part of the right and left opposite sides of the plug body 24a. As illustrated in FIG. 5, an elongated body-side pinching portion 245 projecting upward is provided in a manner with a right and left direction being a longitudinal direction, on a bottom part of the plug body 24a.

The plug lid 24b is a substantially tabular member, and a through-hole 246 (see FIG. 5), an engaging protrusion 247, a locking protrusion 248, and a lid-side pinching portion 249 are formed therein. The through-hole 246 is formed in such a manner that the through-hole 246 penetrates in the right and left direction on the front side of the plug lid 24b. An elongated rod-shaped plug pin 25 penetrates the through-hole 246, and right and left opposite ends of the plug pin 25 are inserted into the journaling holes 244 of the plug body 24a. That is, the plug lid 24b is supported by the plug body 24a so as to be able to swing around a central axis of the plug pin 25.

The engaging protrusion 247 is formed in a manner of projecting upward from an upper surface of the plug lid 24b. The locking protrusion 248 is formed in a manner of projecting outward (rightward and leftward) from the right and left opposite ends of the plug lid 24b.

The lid-side pinching portion 249 is in an elongated shape formed to project downward in a manner with the right and left direction being the longitudinal direction, on a lower surface of the plug lid 24b. The lid-side pinching portion 249 is formed at a position facing the body-side pinching portion 245, when the plug lid 24b swings to approach the plug body 24a.

The plug 24 is attached to the end portion of the tube 22 in the following manner. First, the plug lid 24b is caused to swing so as to be away from the plug body 24a, and the tube 22 is provided between the plug body 24a and the plug lid 24b in such a manner that an end surface of the tube 22 projects forward more than the front part of the plug body 24a and a part thereof passes through the rear groove 241.

The plug lid 24b is then caused to swing to approach the plug body 24a, so that the locking protrusion 248 of the plug lid 24b enters the locking groove 243 of the locking piece 242 of the plug body 24a to be locked by the locking piece 242, thereby enabling to attach the plug 24 to the end portion of the tube 22.

In this case, the lid-side pinching portion 249 of the plug lid 24b faces the body-side pinching portion 245 of the plug body 24a, and puts a predetermined portion of the tube 22 between the body-side pinching portion 245 and the lid-side pinching portion 249 to block the tube 22. That is, the plug 24 becomes a blocked posture.

Figure 6:
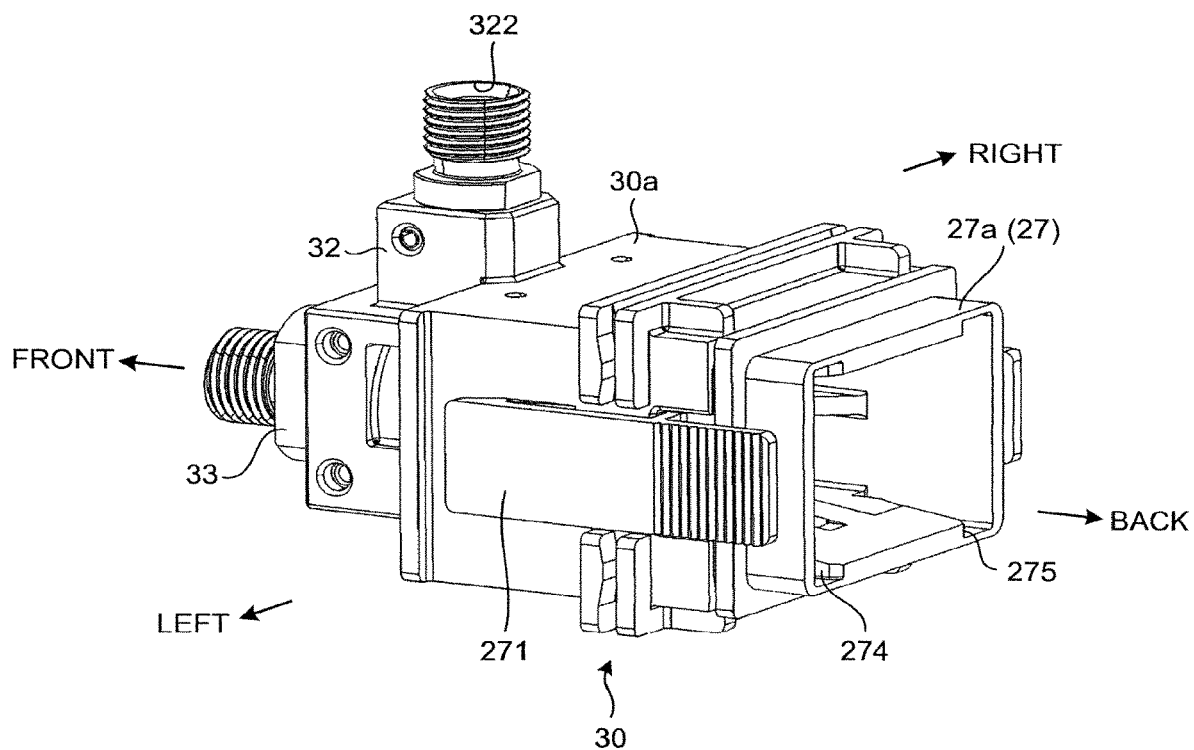
FIG. 6 is a perspective view illustrating a check-valve configuration unit constituting the undiluted-solution feeding unit.
Figure 7:
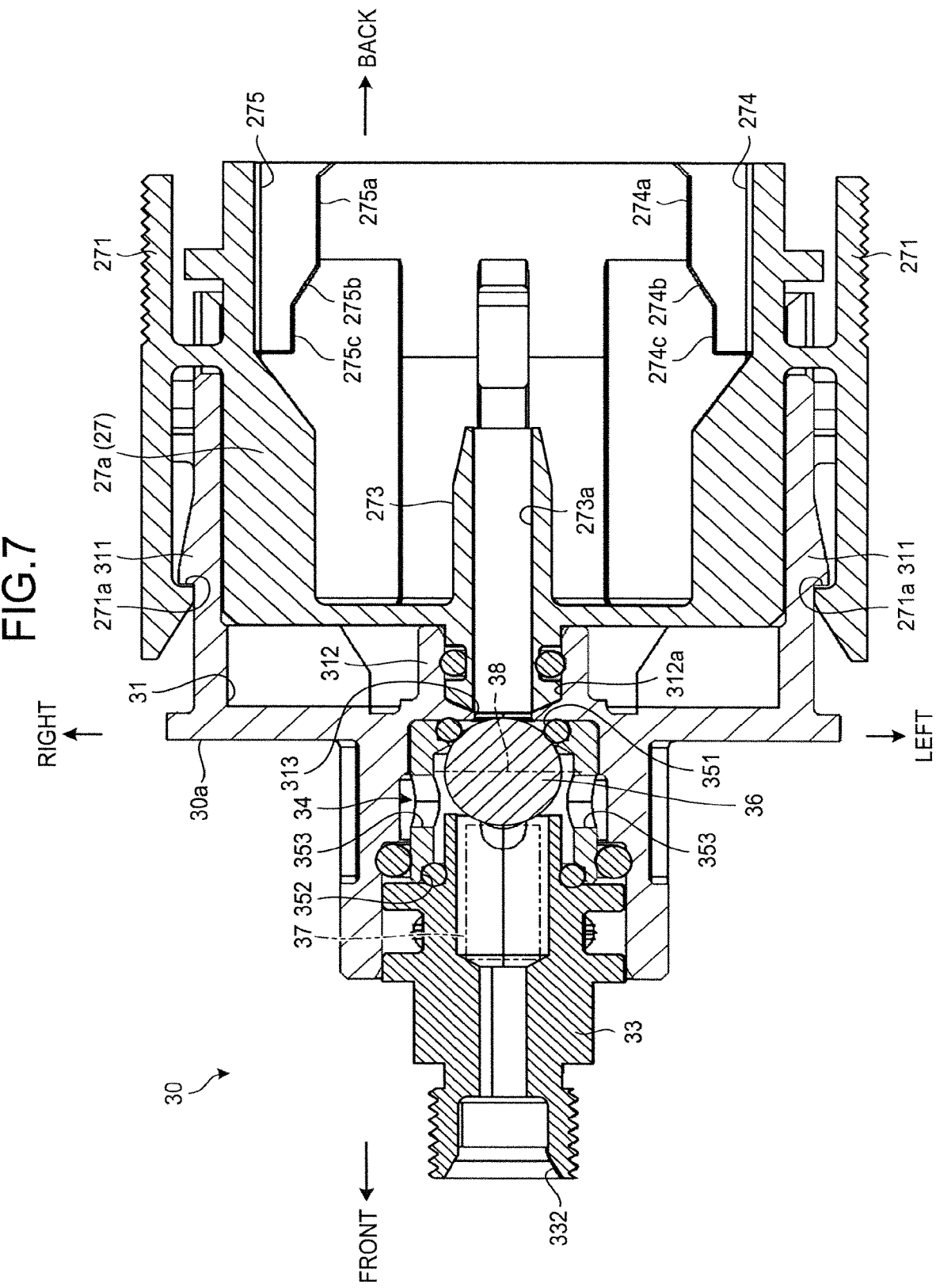
FIG. 7 is a transverse sectional view of the check-valve configuration unit illustrated in FIG. 6.

FIG. 6 is a perspective view illustrating the check-valve configuration unit 30 constituting the undiluted-solution feeding unit 20. FIG. 7 is a transverse sectional view of the check-valve configuration unit 30 illustrated in FIG. 6. The check-valve configuration unit 30 illustrated here is connected to the mixing unit 50 via an undiluted-solution feed pipe 26, and as illustrated in FIG. 6 and FIG. 7, includes a check valve body 30a.

Figure 8:
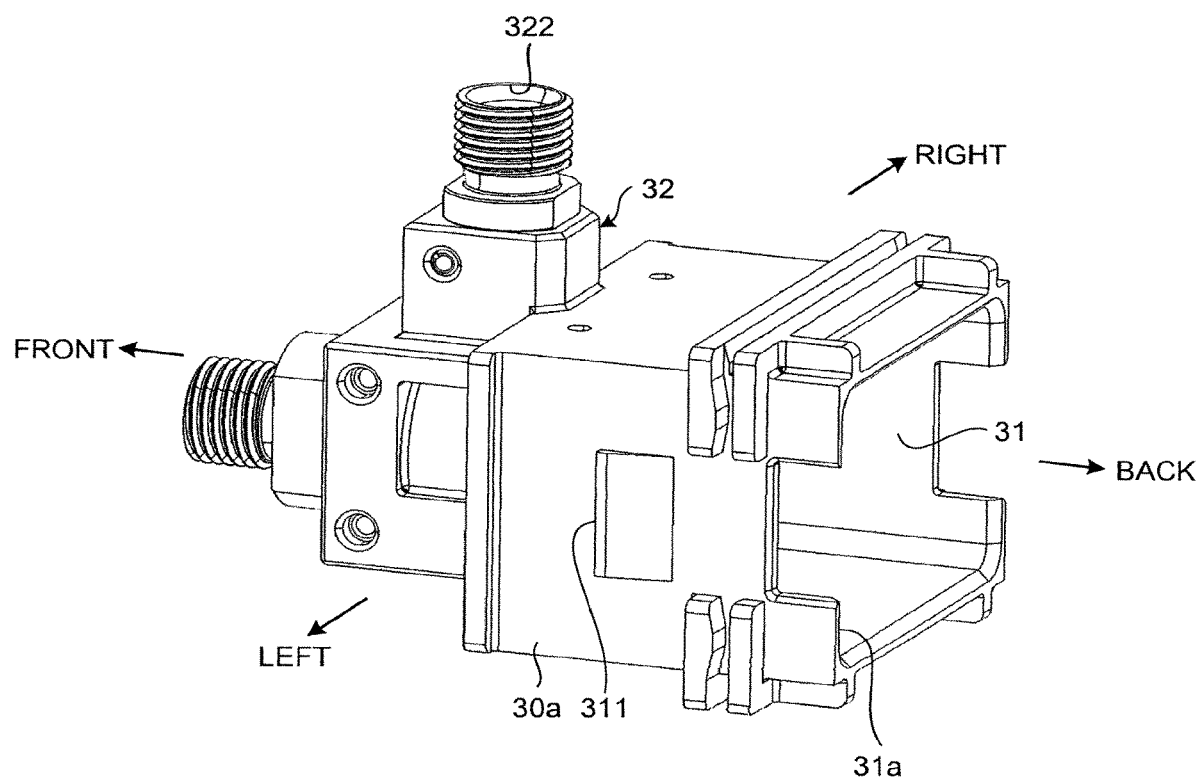
FIG. 8 is a perspective view illustrating a check valve body constituting the check-valve configuration unit illustrated in FIG. 6 and FIG. 7.
Figure 9:
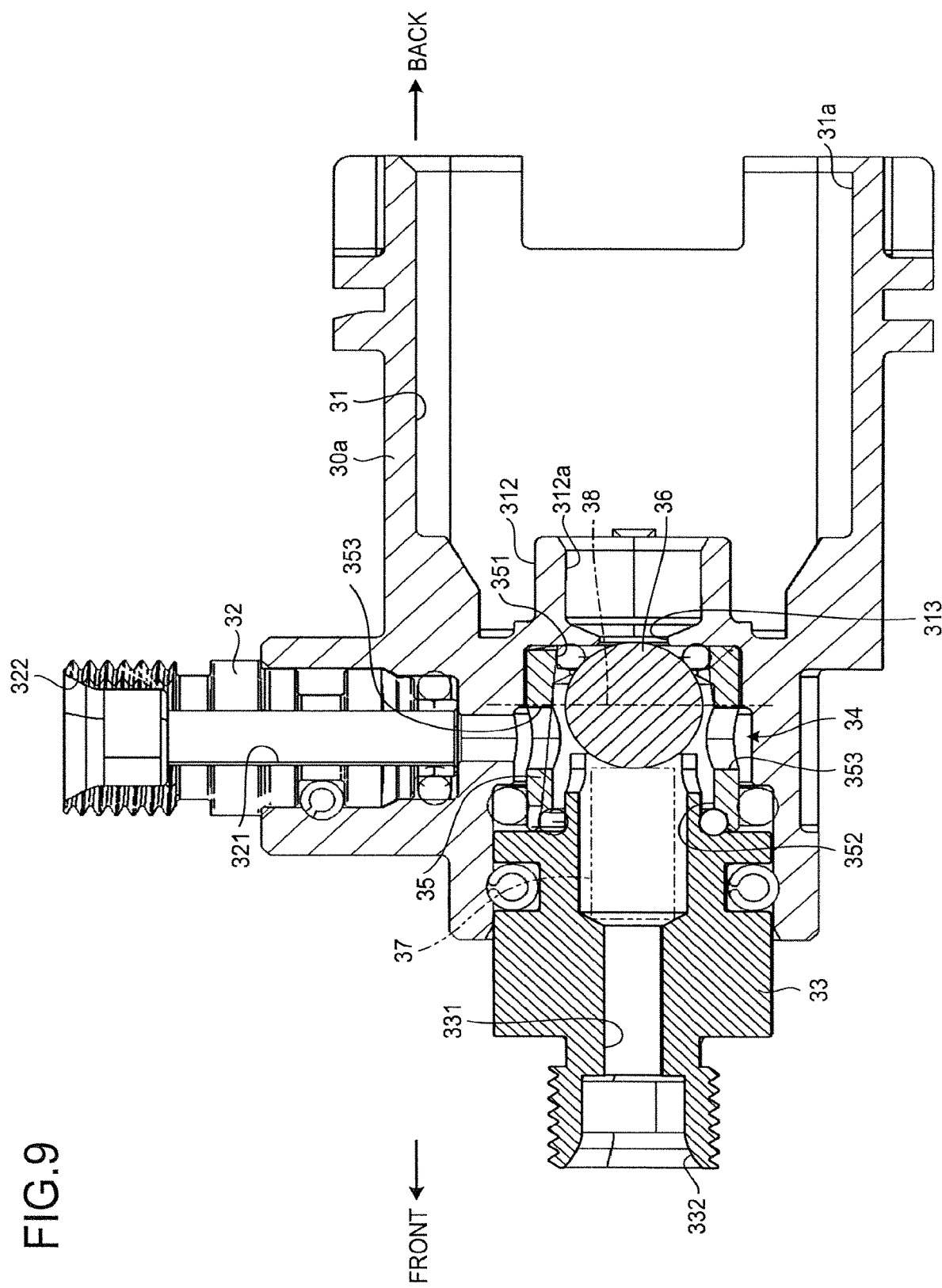
FIG. 9 is a longitudinal sectional view illustrating the check valve body illustrated in FIG. 8 when viewed from the left.
Figure 10:
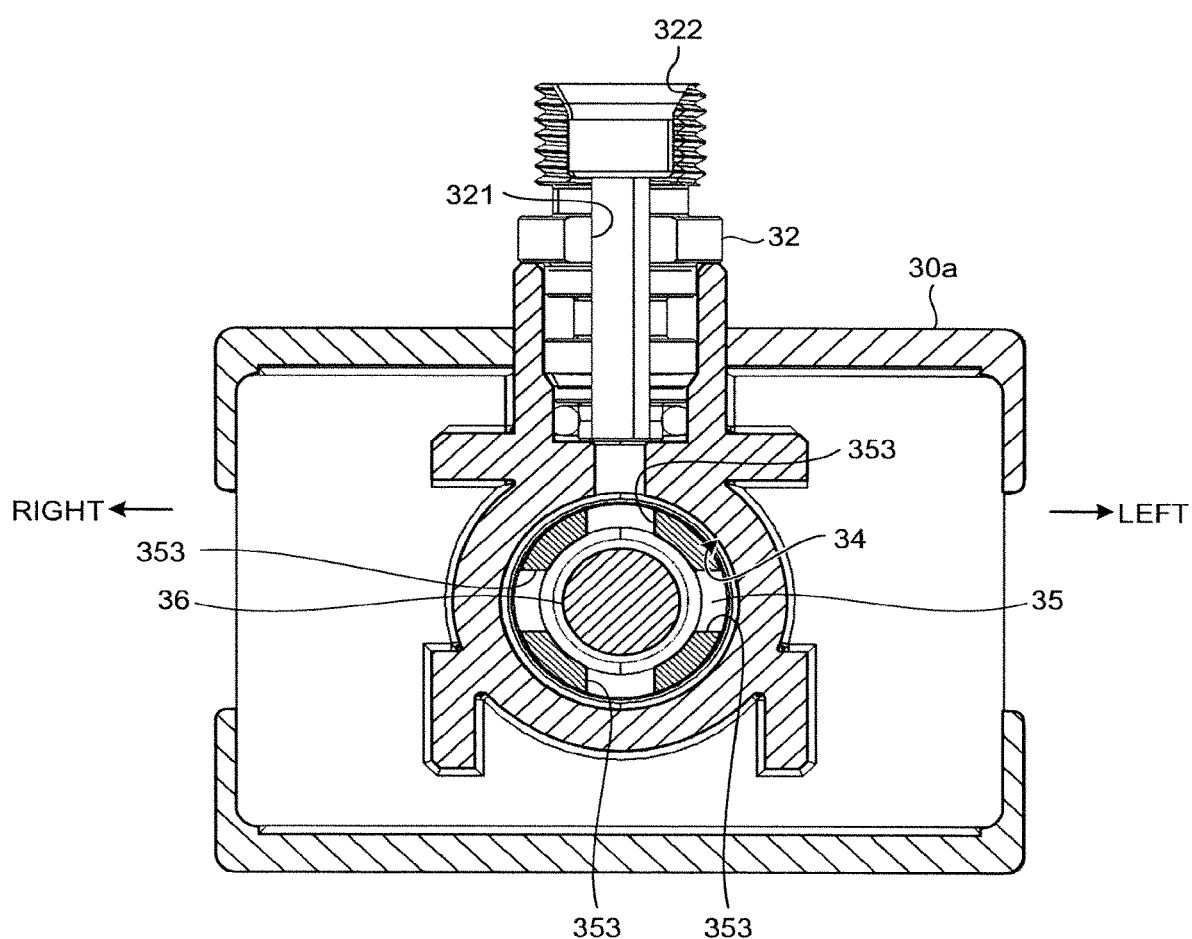
FIG. 10 is a longitudinal sectional view illustrating the check valve body illustrated in FIG. 8 when viewed from the front.

FIG. 8 to FIG. 10 illustrate the check valve body 30a constituting the check-valve configuration unit 30 illustrated in FIG. 6 and FIG. 7, where FIG. 8 is a perspective view, FIG. 9 is a longitudinal sectional view illustrating the check valve body 30a illustrated in FIG. 8 when viewed from the left, and FIG. 10 is a longitudinal sectional view illustrating the check valve body 30a illustrated in FIG. 8 when viewed from the front.

As also illustrated also in FIG. 8 to FIG. 10, the check valve body 30a is configured to include a socket housing unit 31, a vapor inflow portion 32, an undiluted-solution outflow portion 33, and a valve-body housing unit 34. The socket housing unit 31 is configured in a rear part of the check valve body 30a, to allow a socket 27 (see FIG. 6 and FIG. 7) to enter therein through a rear face opening 31a and house the socket 27 therein.

Figure 11:
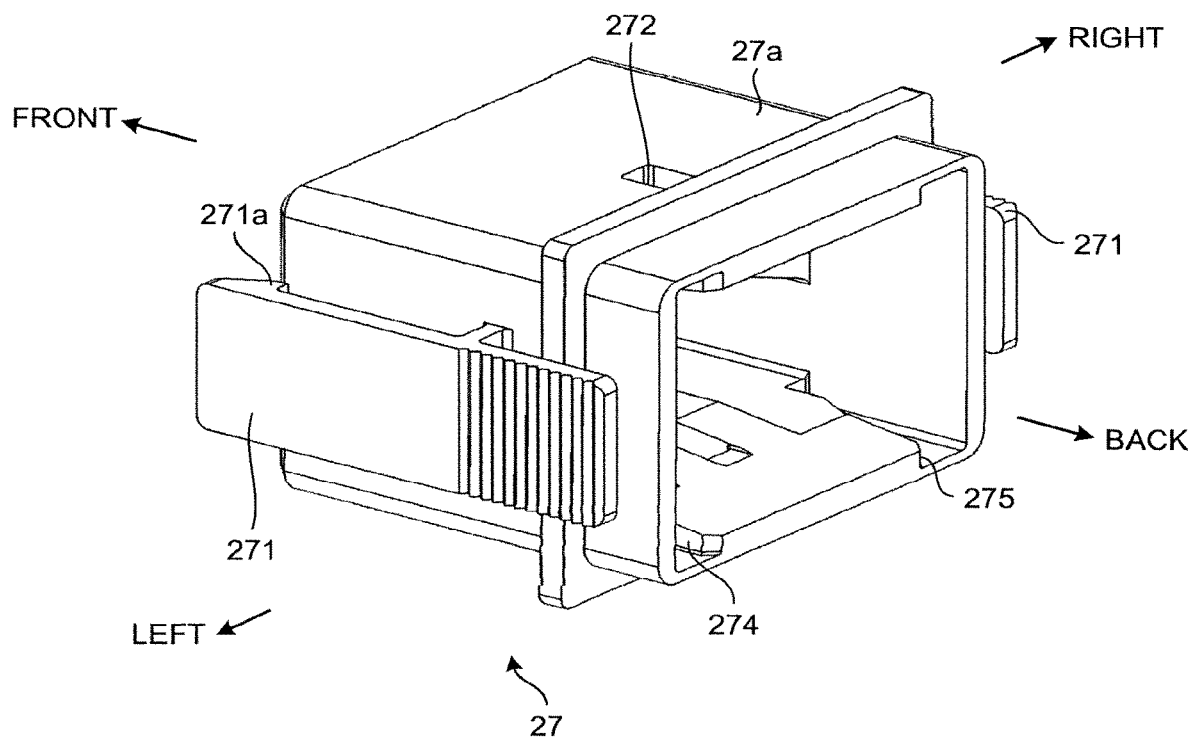
FIG. 11 is a perspective view illustrating the socket.

The socket 27 includes a box-shaped socket body 27a with a rear surface being open, as also illustrated in FIG. 11. The socket 27 is configured to include a locking claw piece 271, a regulating hole 272, an undiluted-solution guiding unit 273, guide grooves 274 and 275 formed in the socket body 27a.

The locking claw piece 271 is provided on each of right and left opposite ends of the socket body 27a, with a front-back direction being a longitudinal direction. A locking claw 271a is formed on the front side of the locking claw piece 271. The regulating hole 272 is a rectangular hole formed in an upper part of the socket body 27a.

The undiluted-solution guiding unit 273 is formed in a manner of projecting forward and rearward in the front part of the socket body 27a and is an elongated cylindrical body with the front-back direction being the longitudinal direction. An outer diameter of the undiluted-solution guiding unit 273 is slightly larger than the inner diameter of the tube 22. The undiluted-solution guiding unit 273 is formed with an undiluted solution passage 273a extending along the front-back direction.

The guide grooves 274 and 275 are formed in a manner to be a matched pair on the rear side in a lower part of the socket body 27a. In the guide groove 274 on the left side, a first right-side front extending part 274a facing the left side part of the socket body 27a at the right end thereof and extending forward, a right-side inclining part 274b communicated with a front end of the first right-side front extending part 274a and gradually inclined leftward as moving toward the front, and a second right-side front extending part 274c communicated with a front end of the right-side inclining part 274b and extending forward are continuously configured.

In the guide groove 275 on the right side, a first left-side front extending part 275a facing the right side part of the socket body 27a at the left end thereof and extending forward, a left-side inclining part 275b communicated with a front end of the first left-side front extending part 275a and gradually inclined rightward as moving toward the front, and a second left-side front extending part 275c communicated with a front end of the left-side inclining part 275b and extending forward are continuously configured.

In the socket 27 described above, a front part of the socket body 27a enters the socket housing unit 31, as illustrated in FIG. 6 and FIG. 7, through the rear face opening 31a of the check valve body 30a, and the locking claw 271a of the locking claw piece 271 of the socket body 27a is locked by a locking protrusion 311 provided on the right and left opposite ends of the check valve body 30a, thereby being housed in the socket housing unit 31. A front end of the undiluted-solution guiding unit 273 enters a hollow part 312a of a cylinder portion 312 in the check valve body 30a. An undiluted-solution inflow port 313 is formed at a front end of the cylinder portion 312, and the undiluted solution passage 273a of the undiluted-solution guiding unit 273 faces the undiluted-solution inflow port 313.

The socket 27 is housed in the socket housing unit 31 to configure the check-valve configuration unit 30. Further, as described above, because the check-valve configuration unit 30 is connected to the undiluted-solution feed pipe 26, the socket 27 is attached to a pipe for feeding the undiluted milk.

The vapor inflow portion 32 is a portion connected to the second vapor feed pipe 13 and includes a vapor inflow passage 321. The vapor inflow passage 321 is communicated with the second vapor feed pipe 13 through a vapor inflow port 322 provided in the check valve body 30a.

The undiluted-solution outflow portion 33 is a portion connected to the undiluted-solution feed pipe 26 and includes an undiluted-solution outflow passage 331. The undiluted-solution outflow passage 331 is communicated with the undiluted-solution feed pipe 26 through an undiluted-solution outflow port 332 provided in the check valve body 30a.

The valve-body housing unit 34 is a chamber defined in a central region of the check valve body 30a, is communicated with the vapor inflow passage 321 and the undiluted-solution outflow passage 331, and communicated with the undiluted solution passage 273a of the undiluted-solution guiding unit 273 of the socket 27 housed in the socket housing unit 31 through the undiluted-solution inflow port 313. A ball guide 35 is provided in the valve-body housing unit 34.

The ball guide 35 has a cylindrical shape, and includes a first opening 351 and a second opening 352. The first opening 351 is formed on the rear side and is communicated with the undiluted-solution inflow port 313. The second opening 352 is formed on the front side and faces the undiluted-solution outflow passage 331 so as to be communicated with the undiluted-solution outflow port 332.

A ball valve 36 is provided inside the ball guide 35. The ball valve 36 is biased rearward at all times by a biasing unit 37 such as a spring, and in an ordinary state, the first opening 351 of the ball guide 35 is blocked to block the undiluted-solution inflow port 313.

A plurality of ejection holes 353 are formed in the ball guide 35. These ejection holes 353 are formed at a predetermined interval along a circumferential direction on a periphery of the ball guide 35, and each of the ejection holes 353 is communicated with the vapor inflow port 322 through the vapor inflow passage 321. These ejection holes 353 are formed at positions facing the surface on the side of the second opening 352 (on the front side) of a median plane 38 (a plane that divides the ball valve 36 equally symmetrically back and forth) of the ball valve 36, with respect to the ball valve 36 in an ordinary state, that is, the ball valve 36 in a state of blocking the first opening 351 to block the undiluted-solution inflow port 313.

Figure 12:
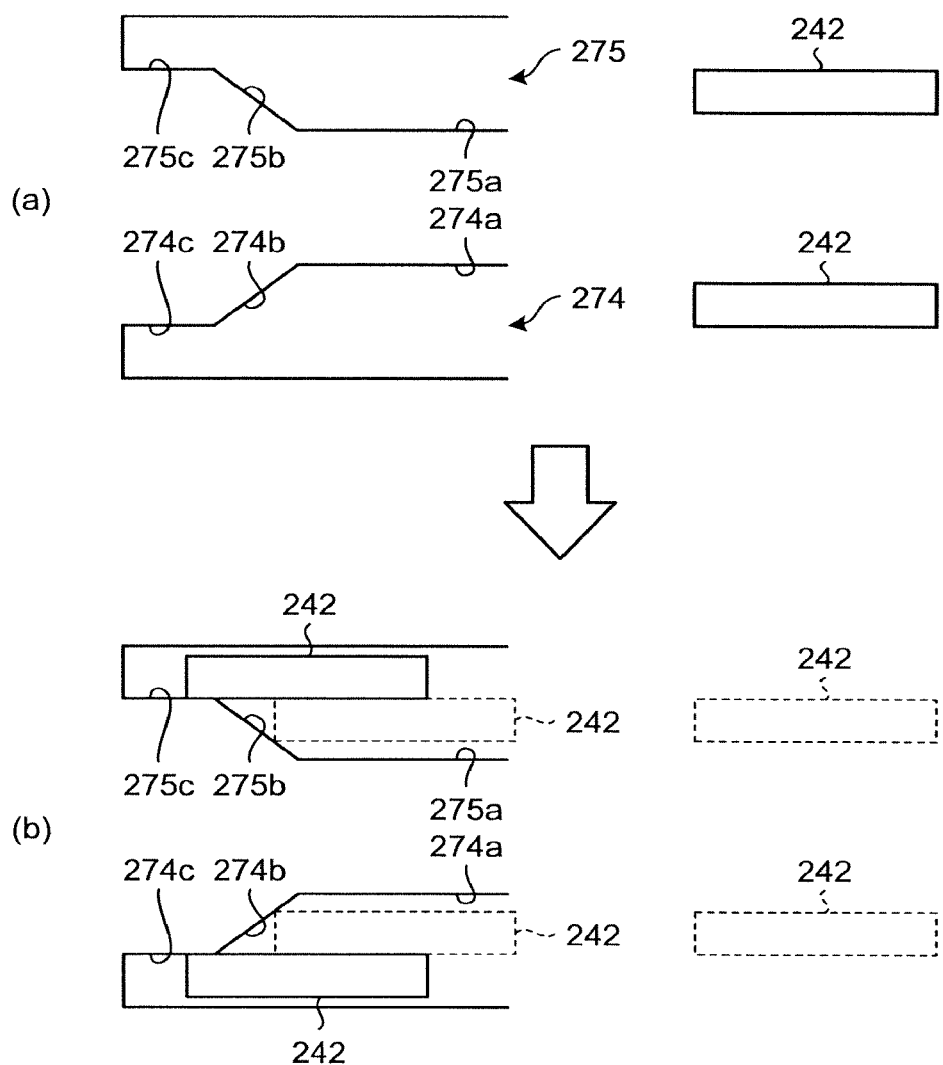
FIG. 12 a drawing schematically illustrating respective relevant parts in a case in which the plug is attached to the socket, where part (a) illustrates a state in which the plug is disengaged from the socket, and part (b) illustrates a state in which the plug enters the socket.

In the undiluted-solution feeding unit 20 having such a configuration, the plug 24 and the socket 27 are coupled with each other in the following manner. As illustrated in FIG. 5, by bringing the plug 24 close to the socket 27 from the rear side thereof, the plug 24 is caused to enter from a rear surface of the socket body 27a. When the plug 24 enters the inside of the socket body 27a, as illustrated in FIG. 12, the matched pair of locking pieces 242 respectively enter the guide grooves 274, 275 corresponding thereto. As a result of the locking pieces 242 entering the corresponding guide grooves 274, 275, the left-side locking piece 242 first contacts slidingly with the right-side inclining part 274b of the guide groove 274 on the left side, and then contacts slidingly with the second right-side front extending part 274c, thereby being displaced leftward. Meanwhile, the right-side locking piece 242 first contacts slidingly with the left-side inclining part 275b of the guide groove 275 on the right side, and then contacts slidingly with the second left-side front extending part 275c, thereby being displaced rightward. In this manner, when the left-side locking piece 242 is displaced leftward and the right-side locking piece 242 is displaced rightward, the locking protrusions 248 having entered the locking grooves 243 of the respective locking pieces 242 are relatively disengaged from the locking grooves 243, thereby bringing the plug lid 24b to a free state.

Figure 13:
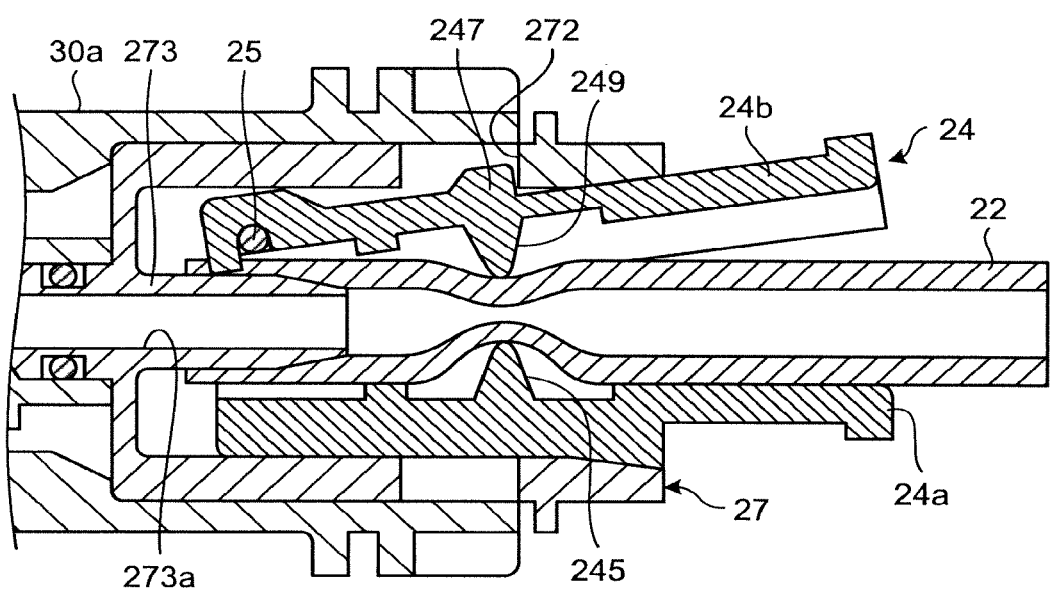
FIG. 13 is a cross-sectional view schematically illustrating a configuration of the plug and the socket.

When the plug lid 24b becomes a free state, the plug lid 24b swings so as to be spaced from the plug body 24a due to elasticity restoring force. As illustrated in FIG. 13, the engaging protrusion 247 of the plug lid 24b enters the regulating hole 272 so that the plug 24 engages with the socket 27 and is coupled with the socket 27. At this time, in the undiluted-solution guiding unit 273 of the socket 27, a part thereof enters the inside of the tube 22, thereby causing the undiluted solution passage 273a of the undiluted-solution guiding unit 273 to be communicated with the inside of the tube 22. Because the plug lid 24b swings, the lid-side pinching portion 249 is spaced from the body-side pinching portion 245 to release the predetermined portion of the tube 22 that has been blocked by these pinching portions. That is, the plug 24 becomes an engaged state with the socket 27, to become a released posture.

It suffices to perform the following process to disengage the plug 24 from the socket 27. The plug lid 24b is swung to approach the plug body 24a so that the engaging protrusion 247 is disengaged from the regulating hole 272. The plug 24 is moved backward in a state in which the plug lid 24b is swung to approach the plug body 24a.

When the plug 24 is moved backward in this manner, the matched pair of locking pieces 242 move rearward relatively in the corresponding guide grooves 274, 275 respectively. That is, the left-side locking piece 242 first contacts slidingly with the right-side inclining part 274b of the guide groove 274 on the left side, and then contacts slidingly with the first right-side front extending part 274a, thereby being displaced rightward. Meanwhile, the right-side locking piece 242 first contacts slidingly with the left-side inclining part 275b of the guide groove 275 on the right side, and then contacts slidingly with the first left-side front extending part 275a, thereby being displaced leftward. In this manner, when the left-side locking piece 242 is displaced rightward and the right-side locking piece 242 is displaced leftward, the locking protrusions 248 enter the locking grooves 243 of the respective locking pieces 242 to be locked by the locking pieces 242, thereby bringing the plug 24 to the blocked posture described above.

In this manner, the plug 24 and the socket 27 have a detachable relation with each other, and while the plug 24 is in the blocked posture when being disengaged from the socket 27, the plug 24 is in a released posture when being coupled with the socket 27. When being coupled with the plug 24, the socket 27 forcibly brings the plug 24 to the released posture. When the plug 24 to be coupled with the socket 27 is in the blocked posture, the socket 27 allows the plug 24 to be disengaged therefrom.

The air feeding unit 40 is configured to include an air feed pipe 41. The air feed pipe 41 is connected to an air pump 42 at one end, and to the mixing unit 50 at the other end, thereby connecting the air pump 42 to the mixing unit 50. The air pump 42 is driven in response to a command provided from the control unit, and when being driven, the air pump 42 compresses air to deliver the compressed air through the air feed pipe 41.

Figure 14:
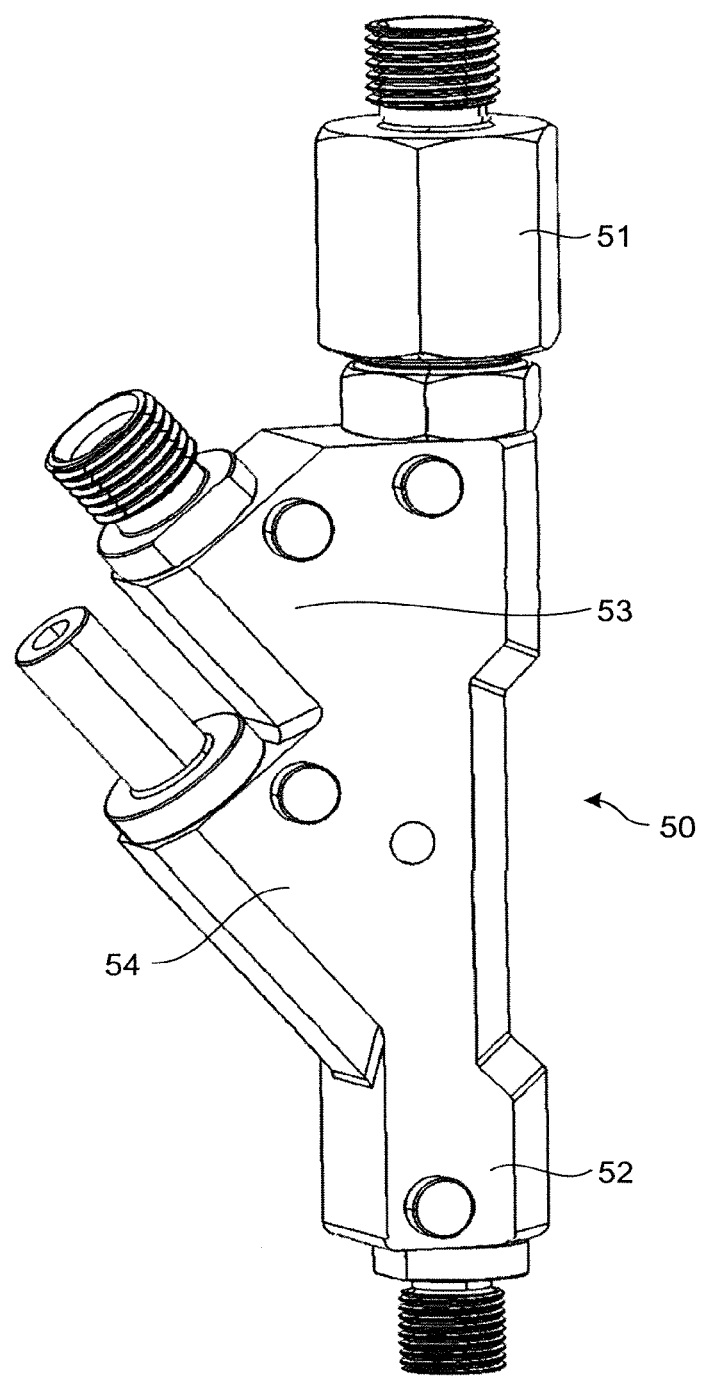
FIG. 14 is a perspective view illustrating a mixing unit illustrated in FIG. 2.
Figure 15:
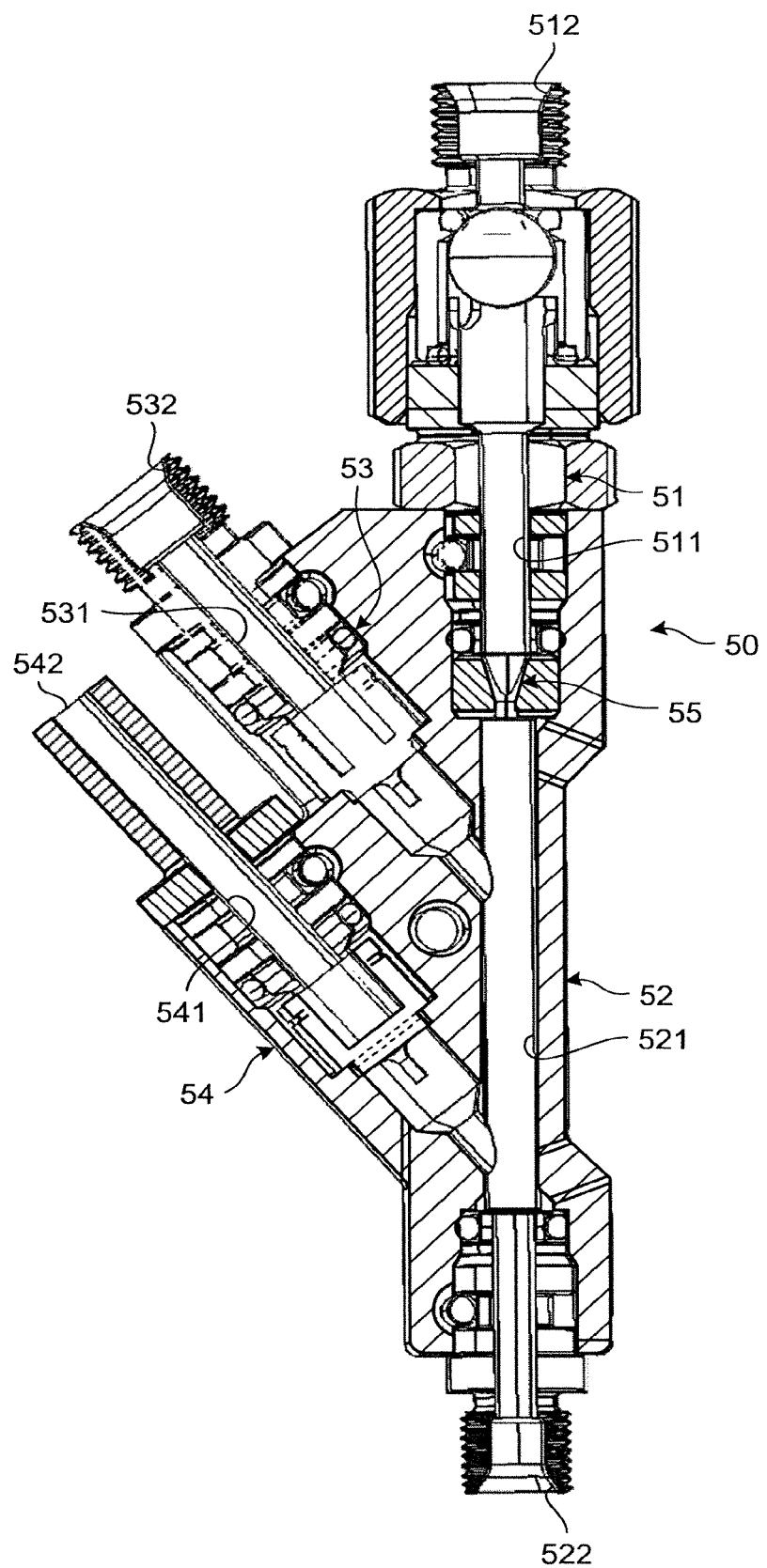
FIG. 15 is a cross-sectional view illustrating the mixing unit illustrated in FIG. 2.

FIG. 14 and FIG. 15 illustrate the mixing unit 50 illustrated in FIG. 2, where FIG. 14 is a perspective view and FIG. 15 is a cross-sectional view. The mixing unit 50 illustrated herein is connected to the first vapor feed pipe 12, the undiluted-solution feed pipe 26, and the air feed pipe 41, and is also connected to a beverage delivery duct 80. The beverage delivery duct 80 is connected to the mixing unit 50 at one end, and to the foaming unit 60 at the other end, thereby connecting the mixing unit 50 to the foaming unit 60. The mixing unit 50 includes a vapor introducing unit 51, a beverage mixing unit 52, an undiluted-solution introducing unit 53, and an air introducing unit 54.

The vapor introducing unit 51 is a portion connecting to the first vapor feed pipe 12, and includes a vapor introducing passage 511. The vapor introducing passage 511 is communicated with the first vapor feed pipe 12 through a vapor introducing port 512.

The beverage mixing unit 52 is a portion connecting to the beverage delivery duct 80, and includes a mixing passage 521. The mixing passage 521 is communicated with the vapor introducing passage 511 through an orifice 55, and communicated with the beverage delivery duct 80 through a beverage delivery port 522.

The undiluted-solution introducing unit 53 is a portion connecting to the undiluted-solution feed pipe 26, and includes an undiluted-solution introducing passage 531. The undiluted-solution introducing passage 531 is communicated with the undiluted-solution feed pipe 26 at one end through an undiluted-solution introducing port 532. The undiluted-solution introducing passage 531 is communicated with the mixing passage 521 at the other end.

The air introducing unit 54 is a portion connecting to the air feed pipe 41, and includes an air introducing passage 541. The air introducing passage 541 is communicated with the air feed pipe 41 at one end through an air introducing port 542. The air introducing passage 541 is communicated with the mixing passage 521 at the other end. The position at which the air introducing passage 541 is communicated with the mixing passage 521 is positioned on a downstream side of a position at which the undiluted-solution introducing passage 531 is communicated with the mixing passage 521.

Figure 16:
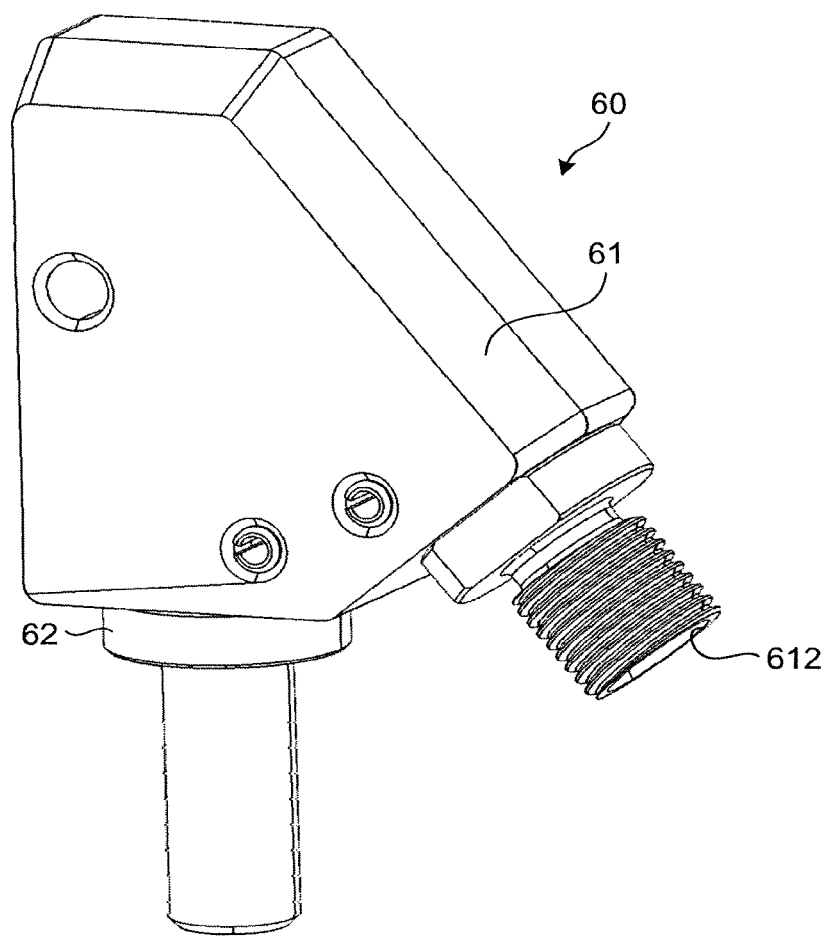
FIG. 16 is a perspective view illustrating a foaming unit illustrated in FIG. 2.
Figure 17:
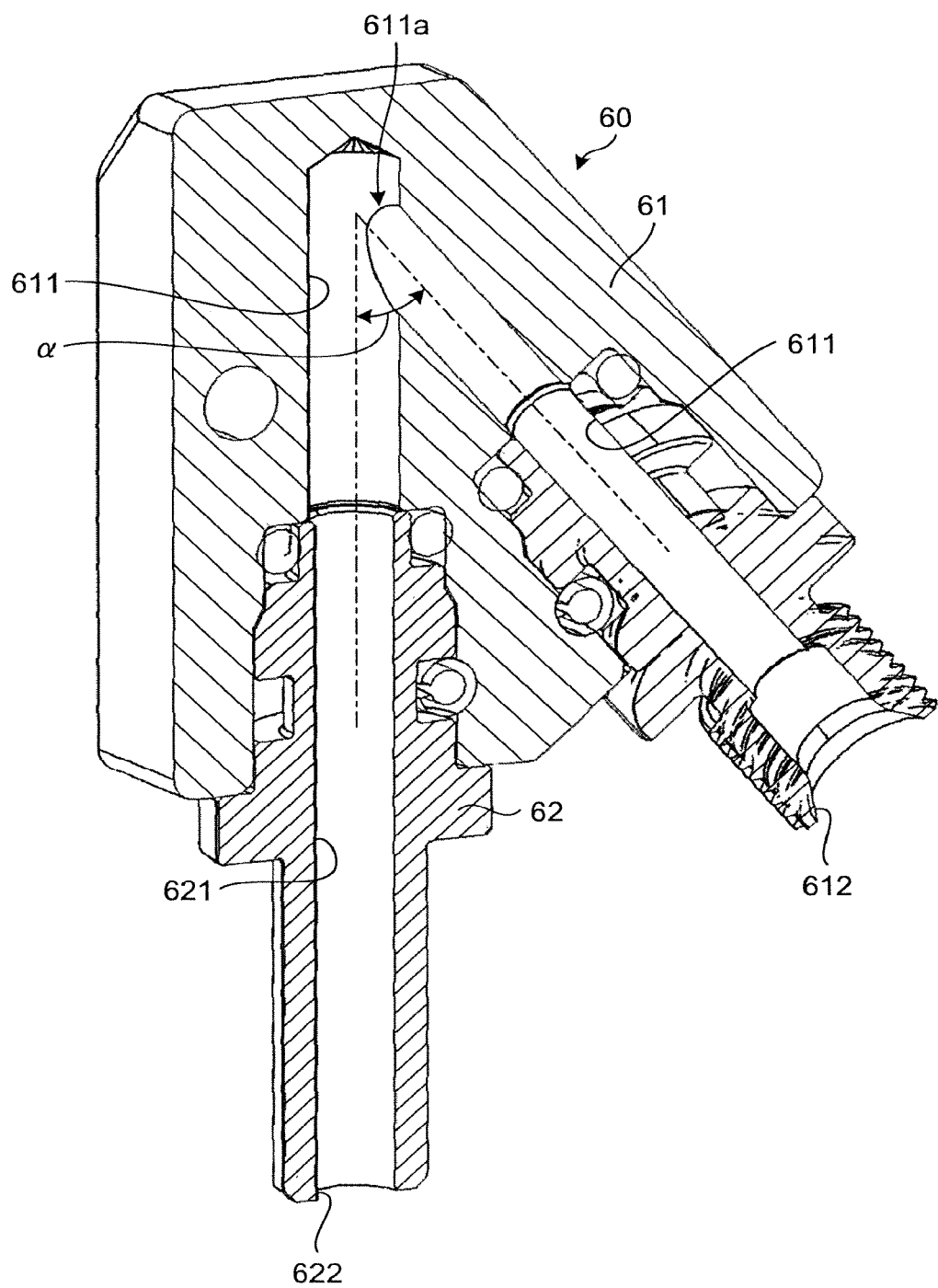
FIG. 17 is a cross-sectional view illustrating the foaming unit illustrated in FIG. 2.

FIG. 16 and FIG. 17 illustrate the foaming unit 60 illustrated in FIG. 2, where FIG. 16 is a perspective view and FIG. 17 is a cross-sectional view. The foaming unit 60 illustrated herein is connected to the beverage delivery duct 80 and is also coupled to the nozzle unit 70. The foaming unit 60 having such a configuration includes a beverage introducing unit 61 and a beverage deriving unit 62.

The beverage introducing unit 61 is a portion connecting to the beverage delivery duct 80, and includes a beverage introducing passage 611. The beverage introducing passage 611 is communicated with the beverage delivery duct 80 through a beverage introducing port 612. The beverage introducing passage 611 is configured to be bent in the middle thereof. An angle α formed between the beverage introducing passage 611 on an upstream side of a bent portion 611a and the beverage introducing passage 611 on a downstream side thereof is preferably an acute angle.

The beverage deriving unit 62 is a portion connecting to the nozzle unit 70, and includes a beverage deriving passage 621. The beverage deriving passage 621 is communicated with the nozzle unit 70 through a beverage deriving port 622. The beverage deriving passage 621 is also communicated with the beverage introducing passage 611.

Figure 18:
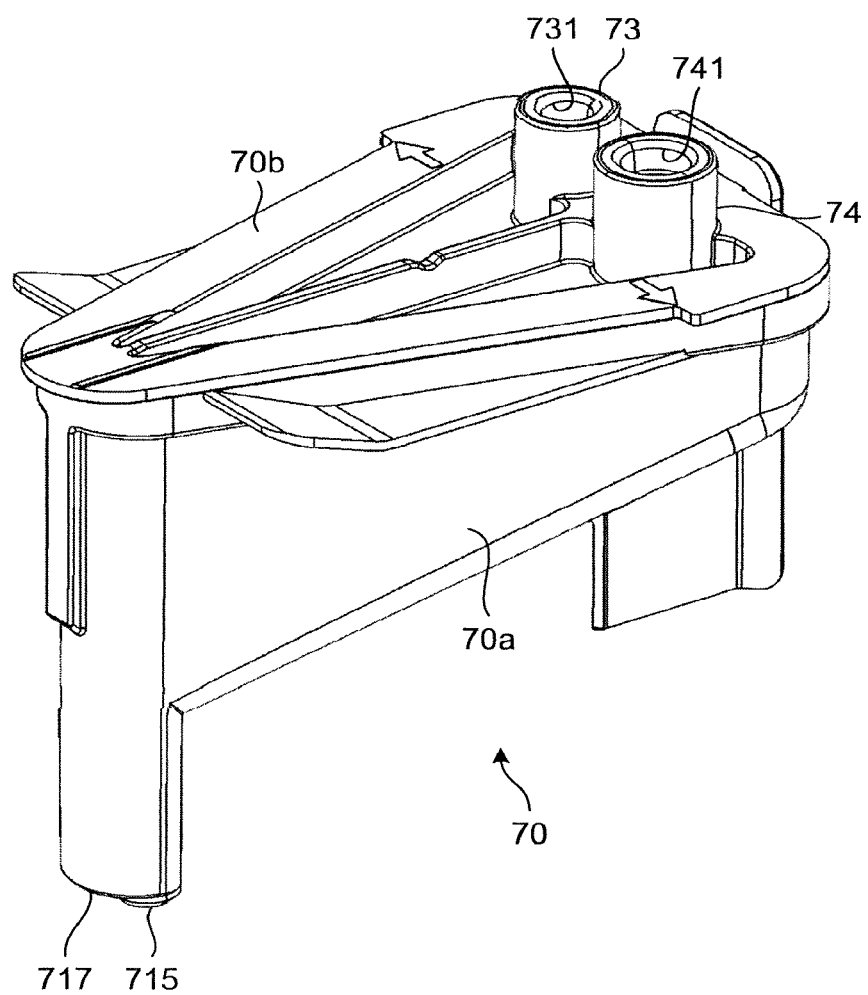
FIG. 18 is a perspective view illustrating a nozzle unit illustrated in FIG. 2.
Figure 19:
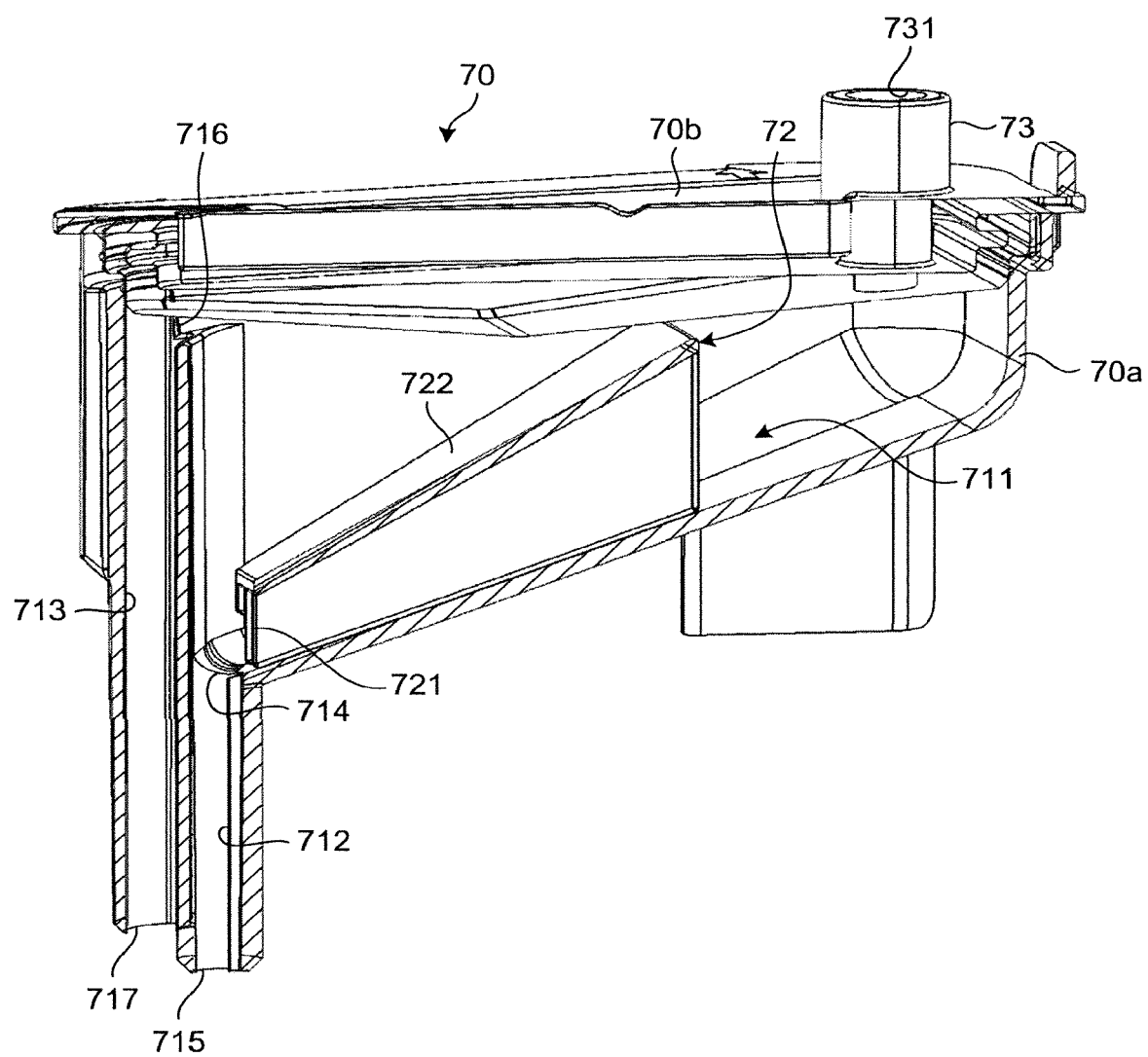
FIG. 19 is a cross-sectional view illustrating the nozzle unit illustrated in FIG. 2.
Figure 20:
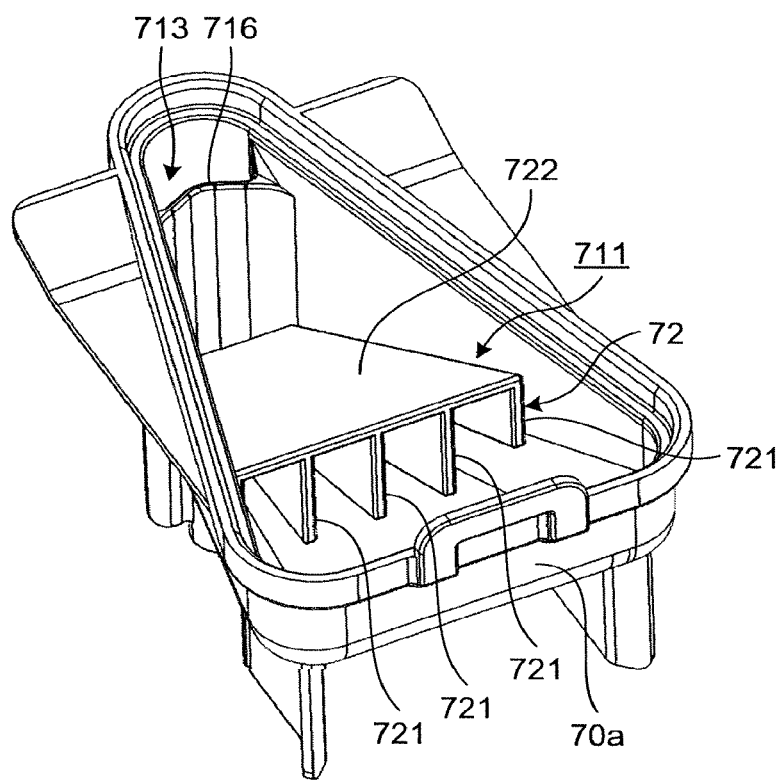
FIG. 20 is a perspective view illustrating an inside of a nozzle body illustrated in FIG. 18 and FIG. 19.

FIG. 18 and FIG. 19 illustrate the nozzle unit 70 illustrated in FIG. 2, where FIG. 18 is a perspective view and FIG. 19 is a cross-sectional view. The nozzle unit 70 illustrated herein is housed in a nozzle housing unit 4 provided on the front surface of the dispenser body 1*a* as illustrated in FIG. 1, and includes a nozzle body 70*a* and a nozzle lid 70*b*.

The nozzle body 70*a* is a container with a top part being open, and a bottom part gradually inclined downward as moving from a base end toward a tip end. A nozzle chamber 711, a discharge passage 712, and an emission passage 713 are formed in the nozzle body 70*a*. The nozzle chamber 711 occupies a most part of the nozzle body 70*a*.

The discharge passage 712 is formed at the tip end in the nozzle body 70*a* and extends downward. The discharge passage 712 is communicated with the nozzle chamber 711 through a discharge communication port 714, and is also communicated with outside through a discharge port 715 formed in the nozzle body 70*a*. The discharge communication port 714 is provided in a lower part of the nozzle chamber 711.

The emission passage 713 is formed at the tip end of the nozzle body 70*a* and extends downward in a manner of being adjacent to the discharge passage 712. The emission passage 713 is communicated with the nozzle chamber 711 through an emission communication port 716, and is also communicated with outside through an emission port 717 formed in the nozzle body 70*a*. The emission communication port 716 is provided in an upper part of the nozzle chamber 711.

Figure 21:
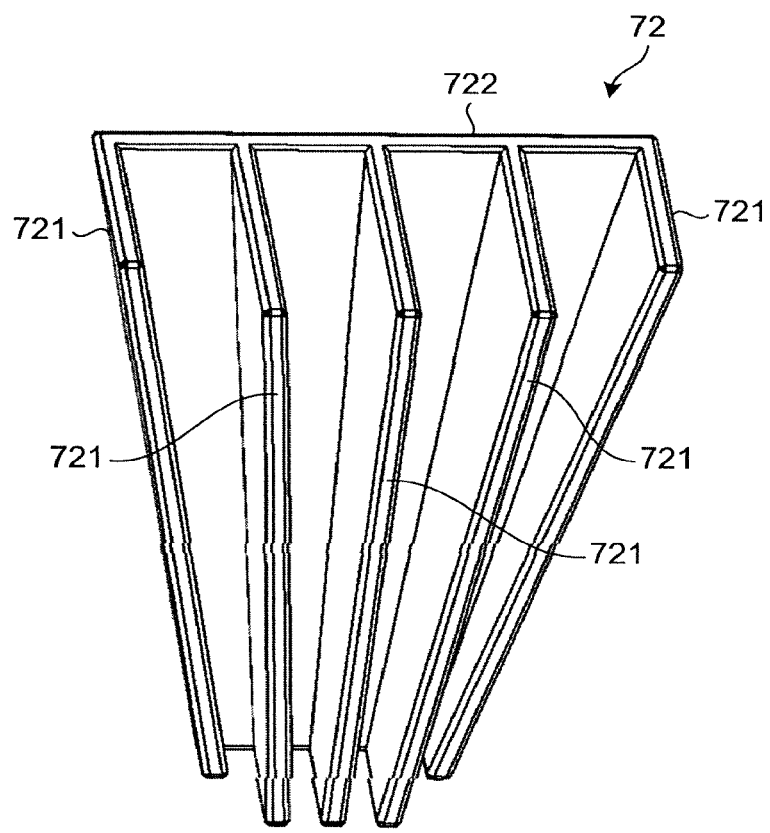
FIG. 21 is a perspective view illustrating a beverage guiding unit illustrated in FIG. 20.

In the nozzle body 70*a*, a beverage guiding unit 72 is provided in the nozzle chamber 711. The beverage guiding unit 72 is provided in a lower part of the nozzle chamber 711, that is, at the bottom part of the nozzle body 70*a*. Tabular members 721 being a plurality of passage constituent elements are provided in parallel in the beverage guiding unit 72, and upper ends of the respective tabular members 721 are coupled with a common support plate 722. As illustrated in FIG. 21, the respective tabular members 721 in the beverage guiding unit 72 are provided in such a manner that gaps between the tabular members 721 adjacent to each other decrease as approaching the discharge communication port 714 (the discharge port 715). The beverage is caused to pass between the tabular members 721 adjacent to each other, and then caused to pass through the discharge passage 712.

The nozzle lid 70*b* is attached to the nozzle body 70*a* in a manner of blocking the top part of the nozzle body 70*a*. The nozzle lid 70*b* includes a connecting tube 73 and a vapor emitting portion 74. The connecting tube 73 is a cylindrical portion projecting upward from the nozzle lid 70*b*. The connecting tube 73 is formed with a hollow part 731 communicated with the inside of the nozzle body 70*a*, to allow entering of a part of the beverage deriving unit 62 of the foaming unit 60, thereby coupling the beverage deriving unit 62 with the foaming unit 60.

The vapor emitting portion 74 is a cylindrical portion projecting upward from the nozzle lid 70*b* similar to the connecting tube 73. The vapor emitting portion 74 is formed with a hollow part 741 communicated with the inside of the nozzle body 70*a*, to emit a part of vapor delivered to the inside of the nozzle body 70*a*.

In the milk beverage feeding device having the configuration described above, milk can be fed to the cup C in a foamed state in the following manner. It is assumed that the first vapor feed valve 14 is open and the tube pump 23 and the air pump 42 are driven by the control unit. The second vapor feed valve 15 is closed.

By driving the tube pump 23, the undiluted milk in the BIB 21 is pumped in the undiluted-solution feeding unit 20.

The undiluted milk pumped out of the BIB 21 passes through the tube 22, passes through the undiluted solution passage 273*a* of the undiluted-solution guiding unit 273 in the socket 27, and reaches the undiluted-solution inflow port 313. The undiluted-solution inflow port 313 is blocked by the ball valve 36. However, the undiluted-solution inflow port 313 retreats forward against the biasing force of the biasing unit 37, due to the pressure of the undiluted milk pumped out of the BIB 21. Accordingly, the undiluted-solution inflow port 313 and the first opening 351 are open, and the undiluted milk reaches the undiluted-solution outflow passage 331 via the undiluted-solution inflow port 313 and the first opening 351, and passes through the undiluted-solution outflow passage 331 and then through the undiluted-solution feed pipe 26. The undiluted milk passing through the undiluted-solution feed pipe 26 reaches the undiluted-solution introducing passage 531 in the mixing unit 50.

Because the first vapor feed valve 14 is open, the pressurized vapor generated in the vapor tank 11 passes through the first vapor feed pipe 12 and reaches the vapor introducing passage 511 in the mixing unit 50. Further, by driving the air pump 42, the compressed air passes through the air feed pipe 41 to reach the air introducing passage 541 in the mixing unit 50.

In the mixing unit 50, the pressurized vapor having passed through the vapor introducing passage 511 is decompressed by passing through the orifice 55, and passes through the mixing passage 521 in a state in which the flow rate is increased. Accordingly, the undiluted milk in the undiluted-solution introducing passage 531 reaches the mixing passage 521 by the Venturi effect, and is heated by the pressurized vapor.

Further, in the mixing unit 50, the compressed air in the air introducing passage 541 enters the mixing passage 521, is mixed with the undiluted milk heated by the pressurized vapor, to generate the milk beverage. The milk beverage generated here becomes a slightly foamed state by the compressed air. The milk beverage generated in the mixing unit 50 in this manner passes through the beverage delivery duct 80, and reaches the beverage introducing passage 611 in the foaming unit 60.

In the foaming unit 60, a flow passage of the milk beverage passing through the beverage introducing passage 611 is changed by the bent portion 611*a* of the beverage introducing passage 611, and the milk beverage hits a wall surface of the passage in the bent portion 611*a*. Accordingly, the foaming quantity of the milk beverage is increased and the milk beverage is foamed. The milk beverage foamed in this manner passes through the beverage deriving passage 621 to be delivered to the nozzle unit 70.

The foamed milk beverage delivered to the nozzle unit 70 is accumulated temporarily in the nozzle chamber 711, and passes between the tabular members 721 in the beverage guiding unit 72. The tabular members 721 are provided in parallel so that the gap therebetween decreases as approaching the discharge port 715. Therefore, the milk beverage having large bubbles cannot pass between the tabular members 721 and is accumulated therein, and only the milk beverage having fine bubbles passes between the tabular members 721.

Because a part of vapor or the like is emitted from the vapor emitting portion 74 provided in the nozzle lid 70*b* and the emission passage 713, the milk beverage temporarily accumulated in the nozzle chamber 711 passes between the tabular members 721 and then passes through the discharge passage 712, and is discharged to the cup C from the discharge port 715, thereby feeding the milk beverage.

After feeding a predetermined amount of milk beverage in this manner, in the milk beverage feeding device, the control unit opens the second vapor feed valve 15 and stops driving of the tube pump 23. Driving of the air pump 42 is maintained and the first vapor feed valve 14 is also open.

When the second vapor feed valve 15 is open, the pressurized vapor generated in the vapor tank 11 passes through the second vapor feed pipe 13 to reach the vapor inflow passage 321 of the check-valve configuration unit 30. In the check-valve configuration unit 30, the undiluted milk is not pumped out of the BIB 21 because driving of the tube pump 23 is stopped. Therefore, the undiluted-solution inflow port 313 is blocked by the ball valve 36.

In the check-valve configuration unit 30, the pressurized vapor in the vapor inflow passage 321 reaches the valve-body housing unit 34, and is ejected onto the surface of the ball valve 36 from the ejection holes 353 while passing through the circumference of the ball guide 35. The pressurized vapor ejected onto the surface of the ball valve 36 passes through the undiluted-solution feed pipe 26 via the undiluted-solution outflow passage 331, together with the undiluted milk adhering to the surface of the ball valve 36, and reaches the undiluted-solution introducing passage 531 in the mixing unit 50.

The pressurized vapor in the undiluted-solution introducing passage 531 (the pressurized vapor fed from the check-valve configuration unit 30 together with the undiluted milk) is mixed with the pressurized vapor fed to the mixing unit 50 via the first vapor feed pipe 12 and the compressed air fed to the mixing unit 50 via the air feed pipe 41, and passes through the foaming unit 60 together with the milk adhering to the passage.

The pressurized vapor and the like having passed through the foaming unit 60 in this manner flush milk together with foam accumulated in the nozzle chamber 711 of the nozzle unit 70, which are fed to the cup C from the discharge port 715.

Accordingly, milk remaining in the respective portions from the check-valve configuration unit 30 to the discharge port 715 of the nozzle unit 70 can be fed to the cup C, thereby enabling to perform cleaning on these passages.

Thereafter, the control unit closes the first vapor feed valve 14 and the second vapor feed valve 15 and stops driving of the air pump 42, thereby finishing feed of milk.

As described above, according to the milk beverage feeding device of the embodiment of the present disclosure, undiluted milk, pressurized vapor, and compressed air can be mixed and foamed in the mixing unit 50, and fed to the cup C as a milk beverage. Therefore, as compared with a conventional case in which pressurized vapor and compressed air are fed to a beverage container, and milk is stirred and foamed, it can be prevented that milk and the like scatter around the cup C, which is hygienic. Accordingly, milk can be fed in a foamed state while maintaining a hygienic state.

According to the milk beverage feeding device described above, the milk beverage mixed in the mixing unit 50 is caused to hit the wall surface of the passage at the bent portion 611a of the beverage introducing passage 611 to increase the foaming quantity of the milk beverage in the foaming unit 60. Accordingly, the more foamed milk beverage can be fed to the cup C.

According to the milk beverage feeding device described above, in the beverage guiding unit 72 of the nozzle unit 70, the tabular members 721 are provided in parallel so that the gap therebetween decreases as approaching the discharge port 715, and the milk beverage is caused to pass between these tabular members 721. Therefore, the size of bubbles of the milk beverage to be discharged from the discharge port 715 and fed to the cup C can be made uniform with a small diameter by bursting or accumulating large bubbles. Further, because the milk beverage is not caused to pass through small holes in a porous plate as in the conventional case, it can be suppressed that the feed time of the milk beverage to the cup C becomes long. Therefore, the milk beverage in a foamed state can be fed well while suppressing that the feed time of the milk beverage becomes long.

According to the milk beverage feeding device described above, because the milk beverage delivered to the nozzle unit 70 is temporarily accumulated in the nozzle chamber 711 and discharged from the discharge port 715, it can be prevented that the milk beverage discharged from the discharge port 715 is shaken due to the characteristic of the tube pump 23 used in the undiluted-solution feeding unit 20.

According to the milk beverage feeding device described above, because the beverage guiding unit 72 is provided in the nozzle chamber 711, a surface area of the inside of the nozzle chamber 711 can be increased. Accordingly, the pressurized vapor delivered to the nozzle unit 70 can be caused to dew-condensed at an early stage and be discharged from the discharge port 715 together with the milk beverage remaining in the nozzle chamber 711, thereby enabling to flush the milk beverage well.

According to the milk beverage feeding device described above, while when the plug 24 attached to a tip end of the tube 22 in the BIB 21 is disengaged from the socket 27, the plug 24 is in a blocked posture in which the predetermined portion of the tube 22 is pinched and blocked, when the plug 24 is coupled with the socket 27, the plug 24 becomes a released posture to release the predetermined portion of the tube 22, thereby making the BIB 21 and the undiluted-solution feed pipe 26 to be continuous via the tube 22. Accordingly, it can be suppressed that hands touch the tip end of the tube 22 to contaminate the tube 22 with various bacteria, and the tube 22 can be easily connected to the piping and the like. Therefore, the tube 22 connected to the BIB 21 can be easily connected to the piping for feeding the milk beverage, and the hygienic state can be maintained well.

According to the milk beverage feeding device described above, in the ball guide 35 of the check-valve configuration unit 30, the ejection holes 353 are formed at positions facing the surface on the side of the second opening 352 of the median plane 38 of the ball valve 36, with respect to the ball valve 36 in the state of blocking the first opening 351 to block the undiluted-solution inflow port 313. Accordingly, while maintaining the state in which the ball valve 36 blocks the undiluted-solution inflow port 313, the undiluted milk adhering to the ball valve 36 and the circumference thereof can be flushed. Therefore, the hygienic state of the check-valve configuration unit 30 can be maintained well.

In the milk beverage feeding device according to the embodiment of the present disclosure and the beverage dispenser 1 to which the milk beverage feeding device is applied, the following operational effects can be exhibited in addition to the operational effects described above.

According to the milk beverage feeding device described above, the air compressed by the air pump 42 is fed to the mixing unit 50 and mixed with the undiluted milk and the pressurized vapor. Therefore, by changing the number of revolutions of the air pump 42 or the like to change appropriately the feed amount of the compressed air from the air feeding unit 40 to the mixing unit 50, the foaming quantity of the milk beverage in the mixing unit 50 can be adjusted.

According to the milk beverage feeding device described above, by stopping the feed of the pressurized vapor from the vapor feeding unit 10 to the mixing unit 50 and the feed of the compressed air from the air feeding unit 40 to the mixing unit 50, it is also possible to feed the undiluted milk stored in the BIB 21 to the cup C.

According to the beverage dispenser 1 to which the milk beverage feeding device described above is applied, the refrigerator 2 is open or closed by the rear door 3. Therefore, when the beverage dispenser 1 is installed in a shop, employees of the shop can easily perform replacement or the like of the BIB 21 by opening the rear door 3, without moving to the front side of the beverage dispenser 1. That is, the beverage dispenser 1 can be installed on a counter of the shop, and the replacement work of the BIB 21 by the employees can be easily performed.

While a preferable embodiment of the present disclosure has been described above, the present disclosure is not limited thereto and various changes may be made.

In the embodiment described above, milk is used as an example of the milk beverage. However, in the present disclosure, a milk beverage such as soy milk may be used.

In the embodiment described above, a part of the beverage introducing passage 611 is bent in the foaming unit 60. However, in the present disclosure, the configuration thereof is not particularly limited so long as the heated milk beverage including the compressed air is caused to hit the wall surface of the passage to increase the foaming quantity.

Figure 22:
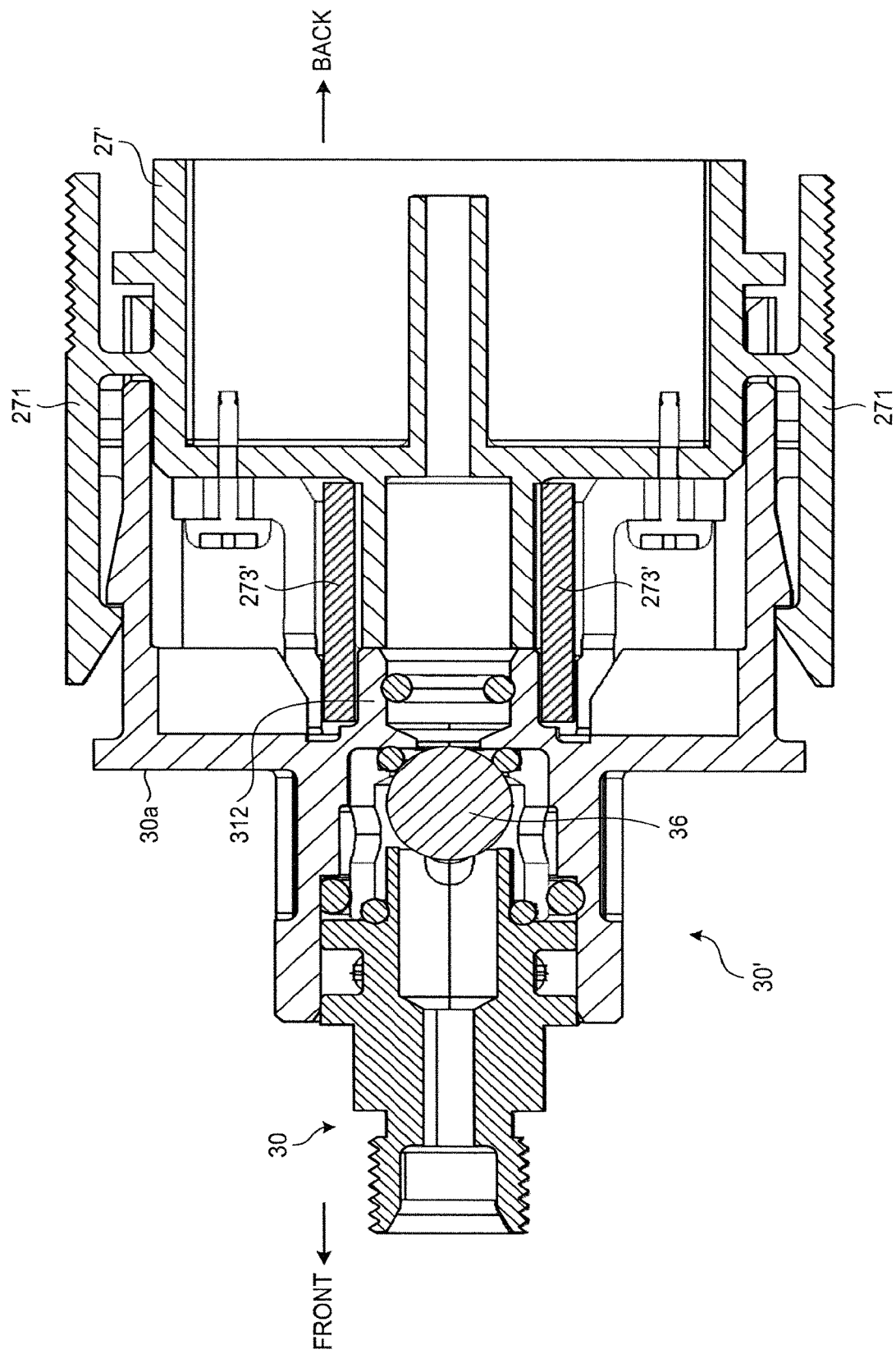
FIG. 22 is a sectional view illustrating a modification of the check-valve configuration unit.

Although not particularly being used in the embodiment described above, in the present disclosure, a cleaning socket 27' as illustrated in FIG. 22 may be housed in the check valve body 30a of a check-valve configuration unit 30'. The cleaning socket 27' illustrated in FIG. 22 is different from the socket 27 described above in that a cylindrical storage unit 273' that covers the cylindrical portion 312 of the check valve body 30a from outside and stores the cylindrical portion 312 therein is provided in place of the undiluted-solution guiding unit 273. By using such a cleaning socket 27', a portion being difficult to be cleaned in a state in which the socket 27 is attached can be cleaned well.

Figure 23:
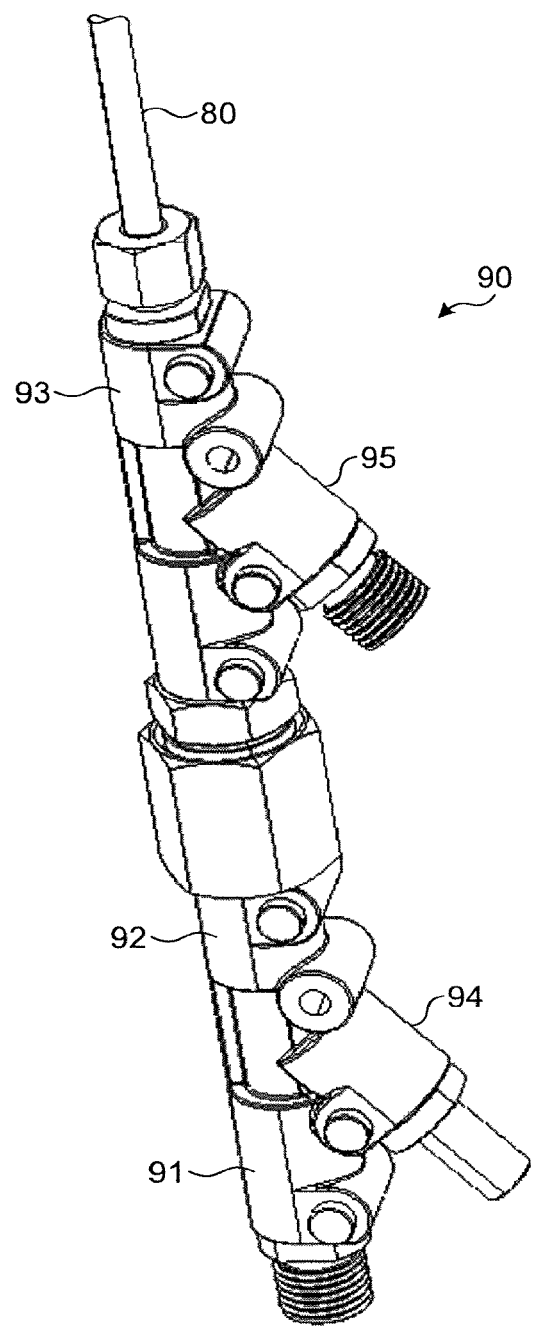
FIG. 23 is a perspective view illustrating a modification of the mixing unit of the milk beverage feeding device according to an embodiment of the present disclosure.
Figure 24:
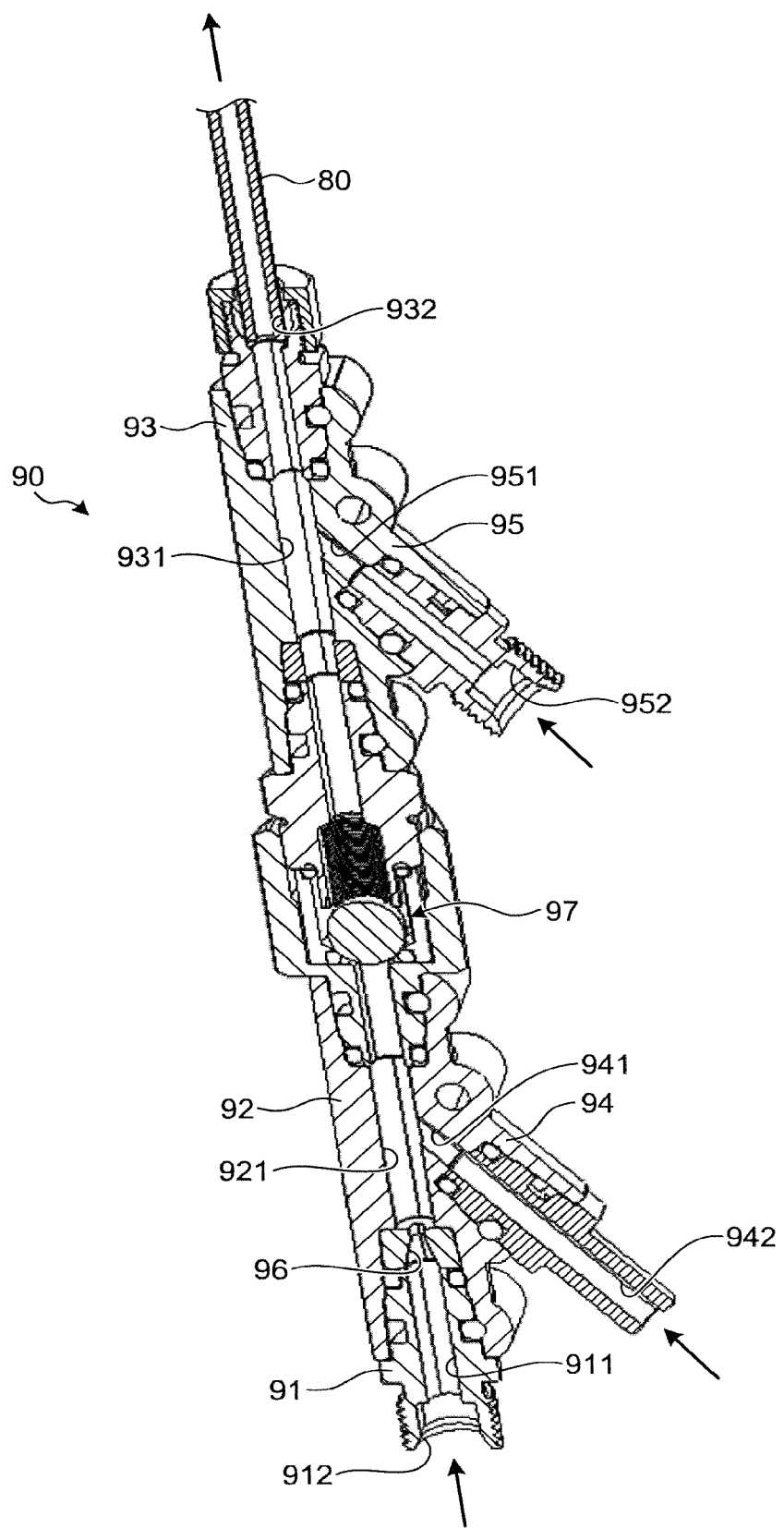
FIG. 24 is a cross-sectional view illustrating a modification of the mixing unit of the milk beverage feeding device according to the embodiment of the present disclosure.
Figure 25:
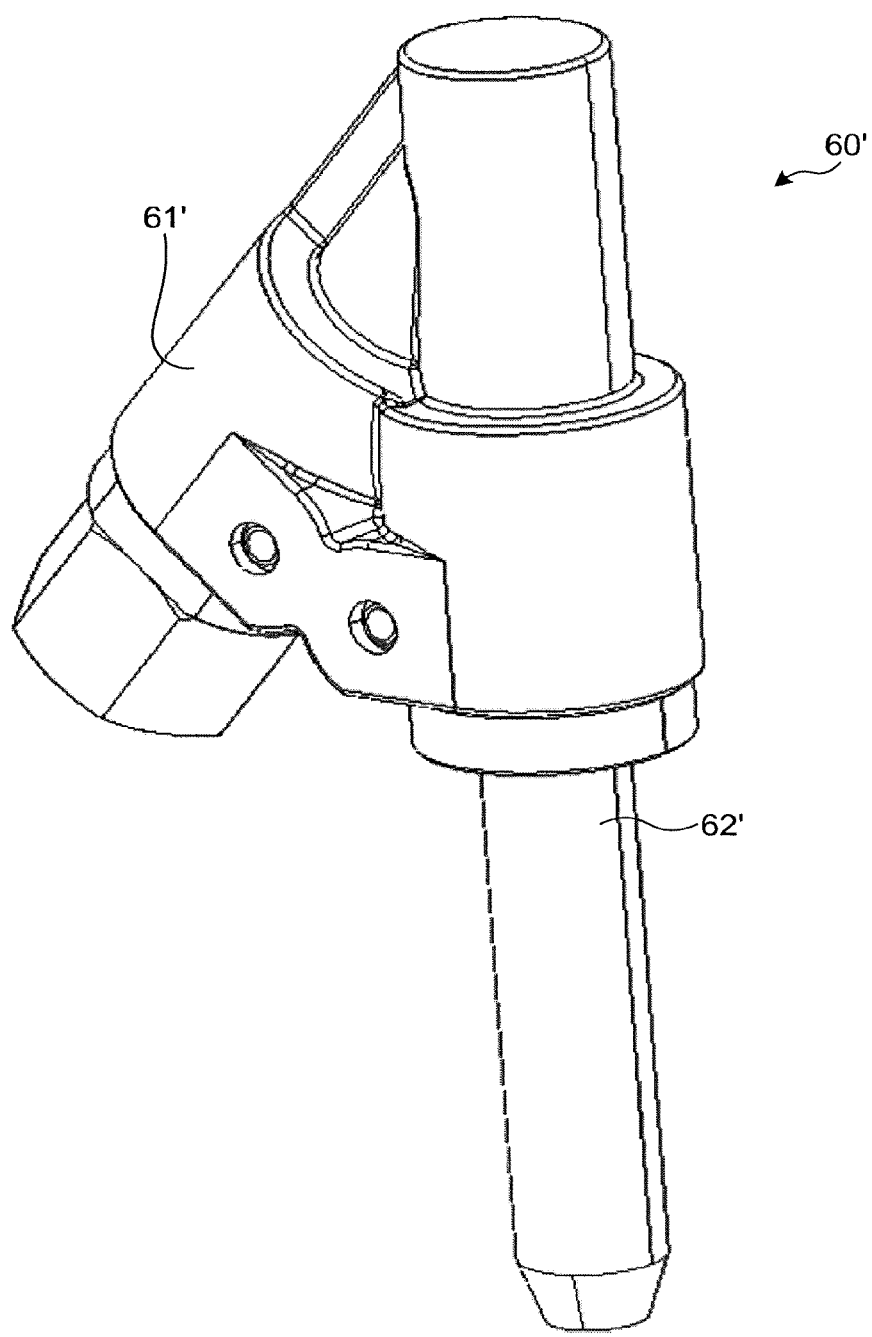
FIG. 25 is a perspective view illustrating a modification of the foaming unit of the milk beverage feeding device according to the embodiment of the present disclosure.
Figure 26:
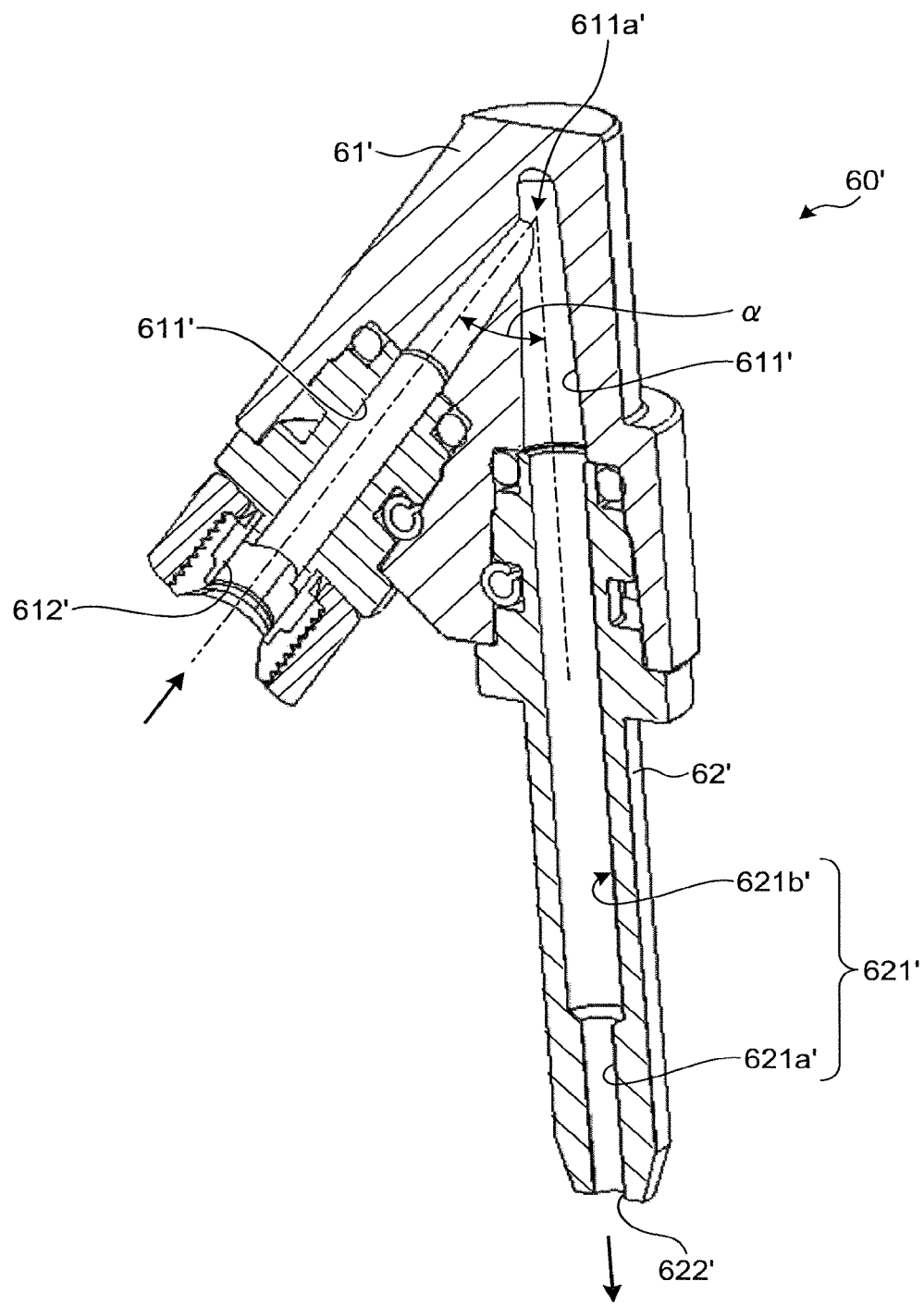
FIG. 26 is a cross-sectional view illustrating a modification of the foaming unit of the milk beverage feeding device according to the embodiment of the present disclosure.

In the present disclosure, a mixing unit and a foaming unit having configurations described below may be used as well. FIG. 23 and FIG. 24 illustrate a modification of the mixing unit of the milk beverage feeding device according to the embodiment of the present disclosure, where FIG. 23 is a perspective view and FIG. 24 is a cross-sectional view. FIG. 25 and FIG. 26 illustrate a modification of the foaming unit of the milk beverage feeding device according to the embodiment of the present disclosure, where FIG. 25 is a perspective view and FIG. 26 is a cross-sectional view.

A mixing unit 90 is connected to the first vapor feed pipe 12, the undiluted-solution feed pipe 26, and the air feed pipe 41, and is also connected to the beverage delivery duct 80. The mixing unit 90 includes a vapor introducing unit 91, a blending unit 92, a beverage mixing unit 93, an air introducing unit 94, and an undiluted-solution introducing unit 95.

The vapor introducing unit 91 is a portion connecting to the first vapor feed pipe 12, and is provided in the lowermost part of the mixing unit 90. The vapor introducing unit 91 includes a vapor introducing passage 911. The vapor introducing passage 911 is communicated with the first vapor feed pipe 12 via a vapor introducing port 912.

The blending unit 92 is provided above the vapor introducing unit 91, and includes a blending passage 921. The blending passage 921 is communicated with the vapor introducing passage 911 through an orifice 96.

The beverage mixing unit 93 is a portion connecting to the beverage delivery duct 80 and is provided above the blending unit 92. The beverage mixing unit 93 includes a mixing passage 931. The mixing passage 931 is communicated with the blending passage 921 via a check valve unit (check valve) 97, and is communicated with the beverage delivery duct 80 via a beverage delivery port 932. The check valve unit 97 is configured so that the flow upward from below, that is, the flow from the blending passage 921 toward the mixing passage 931 becomes a forward direction, to allow movement of a fluid from the blending passage 921 to the mixing passage 931 while regulating movement of the fluid from the mixing passage 931 to the blending passage 921.

The air introducing unit 94 is a portion connecting to the air feed pipe 41 described above, and includes an air introducing passage 941. The air introducing passage 941 is communicated with the air feed pipe 41 at one end through an air introducing port 942. The air introducing passage 941 is also communicated with the blending passage 921 at the other end.

The undiluted-solution introducing unit 95 is a portion connecting to the undiluted-solution feed pipe 26, and includes an undiluted-solution introducing passage 951. The undiluted-solution introducing passage 951 is communicated with the undiluted-solution feed pipe 26 at one end through an undiluted-solution introducing port 952. The undiluted-solution introducing passage 951 is communicated with the mixing passage 931 at the other end. That is, the undiluted-solution introducing unit 95 is provided above the check valve unit 97.

In the mixing unit 90 having the configuration described above, a channel extending along a vertical direction is configured by the vapor introducing passage 911, the blending passage 921, and the mixing passage 931, and the check valve unit 97 is provided in the middle of the channel.

The pressurized vapor having passed through the vapor introducing passage 911 passes through the orifice 96 and is decompressed, and passes through the blending passage 921 in a state in which a flow rate is increased, and then the pressurized vapor is mixed with the compressed air entering from the air introducing passage 941 while passing through the blending passage 921. The pressurized vapor passes through the check valve unit 97 together with the compressed air and then passes through the mixing passage 931. The pressurized vapor and the compressed air passing through the mixing passage 931 in this manner are mixed with the undiluted milk entering from the undiluted-solution introducing passage 951. Accordingly, in the mixing passage 931, a slightly foamed and heated milk beverage is generated. The milk beverage generated in the mixing unit 90 in this manner is delivered to the beverage delivery duct 80.

That is, in the mixing unit 90, the pressurized vapor and the compressed air having passed through the check valve unit 97 are mixed with the undiluted milk fed through the undiluted-solution feeding unit 20, on the upper side of the check valve unit 97 in the channel.

According to the mixing unit 90, when a cleaning solution is fed instead of the undiluted milk through the undiluted-solution feeding unit 20, the cleaning solution flowing into the undiluted-solution introducing passage 951 can be filled in the check valve unit 97, thereby enabling to clean the check valve unit 97 sufficiently.

The foaming unit 60' is connected to the beverage delivery duct 80 and is also coupled to the nozzle unit 70. The foaming unit 60' includes a beverage introducing unit 61' and a beverage deriving unit 62'.

The beverage introducing unit 61' is a portion connecting to the beverage delivery duct 80, and includes a beverage introducing passage 611'. The beverage introducing passage 611' is communicated with the beverage delivery duct 80 through a beverage introducing port 612'. The beverage introducing passage 611' is configured to be bent in the middle thereof. The angle $\alpha$ formed between the beverage introducing passage 611' on an upstream side of a bent portion 611a' and the beverage introducing passage 611' on a downstream side thereof is preferably an acute angle.

The beverage deriving unit 62' is a portion connecting to the nozzle unit 70, and includes a beverage deriving passage 621'. The beverage deriving passage 621' is communicated with the nozzle unit 70 through a beverage deriving port 622'. The beverage deriving passage 621' is also communicated with the beverage introducing passage 611'. A lower end portion 621a' of the beverage deriving passage 621' adjacent to the beverage deriving port 622' is configured to have a smaller diameter than that of an upper end portion 621b'.

In the foaming unit 60' having the configuration described above, the flow passage of the milk beverage passing through the beverage introducing passage 611' is changed by the bent portion 611a' in the beverage introducing passage 611', and the milk beverage hits the wall surface of the passage in the bent portion 611a'. Accordingly, the foaming quantity of the milk beverage is increased and the milk beverage is foamed. The milk beverage foamed in this manner passes through the beverage deriving passage 621' to be delivered to the nozzle unit 70.

According to the foaming unit 60', the foaming quantity of the milk beverage can be increased, and the lower end portion 621a' of the beverage deriving passage 621' has a smaller diameter than that of the upper end portion 621b', thereby enabling to generate fine foam.

According to the present disclosure, the mixing unit mixes a milk-beverage undiluted solution fed from the undiluted solution storage unit through the undiluted-solution feeding unit, pressurized vapor fed in a pressurized state through the vapor feeding unit, and compressed air fed in a compressed state through the air feeding unit, to feed the mixture as a milk beverage to the beverage container. Therefore, as compared with a conventional case in which pressurized vapor and compressed air are fed to a beverage container and a milk beverage is stirred and foamed, it is possible to prevent the milk beverage and the like from being scattered around the beverage container, which is hygienic. Accordingly, an effect is obtained where milk can be fed in a foamed state while ensuring a hygienic state.

The invention claimed is:

1. A milk beverage feeding device comprising
an undiluted-solution storage configured to store a milk-beverage undiluted solution;
an undiluted-solution feeder configured to feed the milk-beverage undiluted solution;
a vapor feeder configured to feed a pressurized vapor in a pressurized state;
an air feeder configured to feed compressed air in a compressed state;
a mixer configured to mix the milk-beverage undiluted solution fed from the undiluted-solution storage through the undiluted-solution feeder, the pressurized vapor fed from the vapor feeder, and the compressed air fed from the air feeder to form a mixture and feed the mixture as a milk beverage; and
a foamer device including a passage to transfer the milk beverage, the passage having an intersection point connecting an axis of an upstream side of the passage to an axis of a downstream side of the passage at an acute angle to cause the milk beverage to hit a wall surface of the passage when the milk beverage transferred through the passage to increase the foaming quality of the milk beverage.

2. The milk beverage feeding device according to claim 1, wherein the undiluted solution storage is a bag-in-box which is a box-like container accommodating a bag-like container enclosing a milk-beverage undiluted solution.

3. A milk beverage feeding device comprising:
an undiluted-solution storage configured to store a milk-beverage undiluted solution;
an undiluted-solution feeder configured to feed the milk-beverage undiluted solution;
a vapor feeder configured to feed a pressurized vapor in a pressurized state;
an air feeder configured to feed compressed air in a compressed state; and
a mixer configured to mix the milk-beverage undiluted solution fed from the undiluted-solution storage through the undiluted-solution feeder, the pressurized vapor fed from the vapor feeder, and the compressed air fed from the air feeder to form a mixture and feed the mixture as a milk beverage to a beverage container, the mixer including
a channel extending in a vertical direction, and
a check valve provided in the channel to allow a fluid to pass therethrough upward from below but restrict the fluid to pass therethrough downward from above, wherein
the pressurized vapor and the compressed air having passed through the check valve are mixed with the milk-beverage undiluted solution fed through the undiluted-solution feeder on an upper side of the check valve in the channel.

* * * * *

UNITED STATES PATENT AND TRADEMARK OFFICE
CERTIFICATE OF CORRECTION

PATENT NO. : 10,863,859 B2
APPLICATION NO. : 15/665460
DATED : December 15, 2020
INVENTOR(S) : Yukihide Mochida Page 1 of 1

It is certified that error appears in the above-identified patent and that said Letters Patent is hereby corrected as shown below:

In the Claims

Column 16, Line 2:
In Claim 1, delete "comprising" and insert -- comprising: --, therefor.

Column 16, Line 22 (approx.):
In Claim 1, after "milk beverage" insert -- is --.

Column 16, Line 23 (approx.):
In Claim 1, delete "increase the foaming quality" and insert -- increase a foaming quantity --, therefor.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*